United States Patent
Henderson

(10) Patent No.: US 7,698,346 B2
(45) Date of Patent: Apr. 13, 2010

(54) NETWORK OPERATING SYSTEM AND METHOD

(75) Inventor: Charles E. Henderson, Lexington, VA (US)

(73) Assignee: Coral Networks, Inc., Keswick, VA (US)

( * ) Notice: Subject to any disclaimer, the term of this patent is extended or adjusted under 35 U.S.C. 154(b) by 1183 days.

(21) Appl. No.: 10/549,306

(22) PCT Filed: Mar. 18, 2004

(86) PCT No.: PCT/US2004/008406

§ 371 (c)(1),
(2), (4) Date: Sep. 16, 2005

(87) PCT Pub. No.: WO2004/084044

PCT Pub. Date: Sep. 30, 2004

(65) Prior Publication Data

US 2006/0101071 A1      May 11, 2006

Related U.S. Application Data

(60) Provisional application No. 60/455,739, filed on Mar. 18, 2003.

(51) Int. Cl.
*G06F 7/00* (2006.01)
*G06F 17/30* (2006.01)
(52) U.S. Cl. .................. 707/781; 707/783; 707/785
(58) Field of Classification Search ............. 707/3, 707/9, 10, 1–2, 8, 203
See application file for complete search history.

(56) References Cited

U.S. PATENT DOCUMENTS

| | | | | |
|---|---|---|---|---|
| 5,701,457 | A * | 12/1997 | Fujiwara | 707/8 |
| 5,941,947 | A * | 8/1999 | Brown et al. | 709/225 |
| 6,292,830 | B1 | 9/2001 | Taylor et al. | |
| 7,136,903 | B1 * | 11/2006 | Phillips et al. | 709/217 |
| 7,246,164 | B2 * | 7/2007 | Lehmann et al. | 709/225 |
| 7,392,255 | B1 * | 6/2008 | Sholtis et al. | 707/203 |
| 7,512,810 | B1 * | 3/2009 | Ryan | 713/189 |
| 2002/0031230 | A1 * | 3/2002 | Sweet et al. | 380/278 |
| 2002/0062451 | A1 * | 5/2002 | Scheidt et al. | 713/201 |
| 2003/0046260 | A1 * | 3/2003 | Satyanarayanan et al. | 707/1 |
| 2003/0149571 | A1 | 8/2003 | Francesco et al. | |
| 2004/0133440 | A1 * | 7/2004 | Carolan et al. | 705/1 |

OTHER PUBLICATIONS

Form PCT/ISA/210 International Application No. PCT/US04/08406, International Filing Date Mar. 18, 2004: International Search Report, dated Sep. 28, 2005.

* cited by examiner

*Primary Examiner*—Don Wong
*Assistant Examiner*—Merilyn P Nguyen
(74) *Attorney, Agent, or Firm*—McGuireWoods LLP; Charles J. Gross

(57) ABSTRACT

A network operating system may be provided. Also, system and method may include a complex data medium that enables the continuous reconciliation of the collaborative information process and product. The system generally may increase productivity by enabling a network dynamic among knowledge workers. The system may unify e-mail and shared file management, synchronous and asynchronous collaboration, serial and parallel work flow, top-down and bottom-up collaboration, and information lifecycle management.

40 Claims, 19 Drawing Sheets

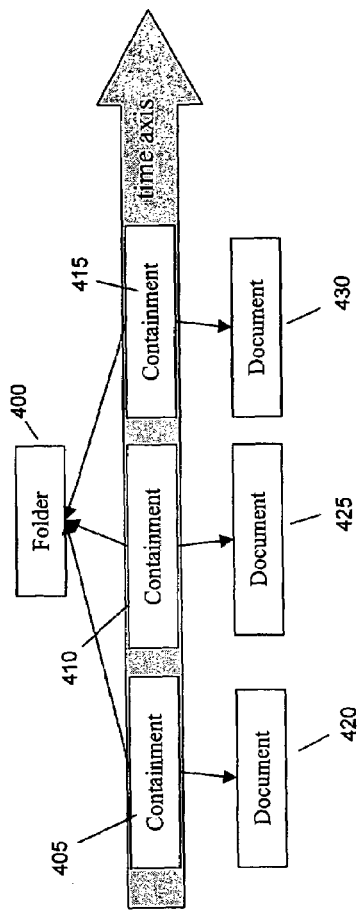
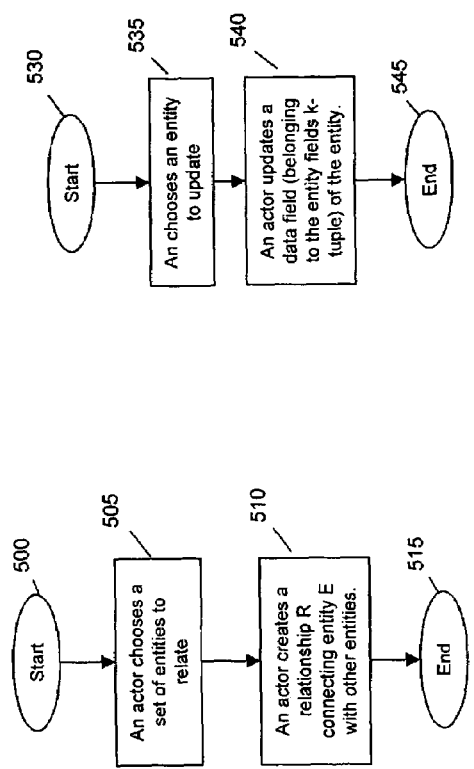
Figure 4
Figure 5A
Figure 5B

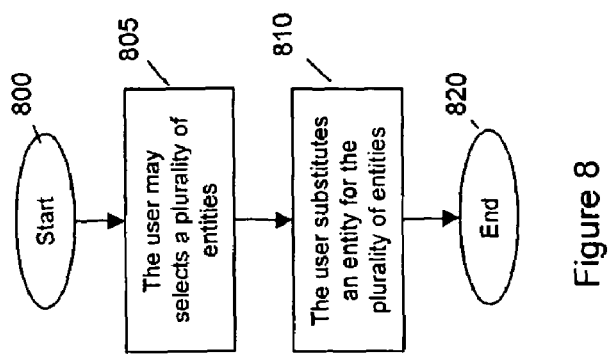
Figure 8
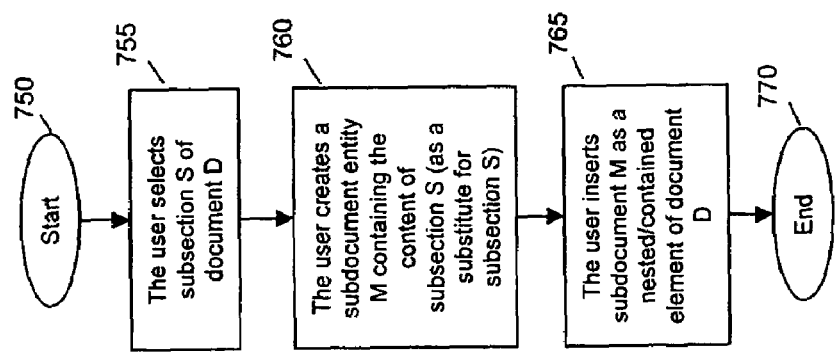
Figure 7B
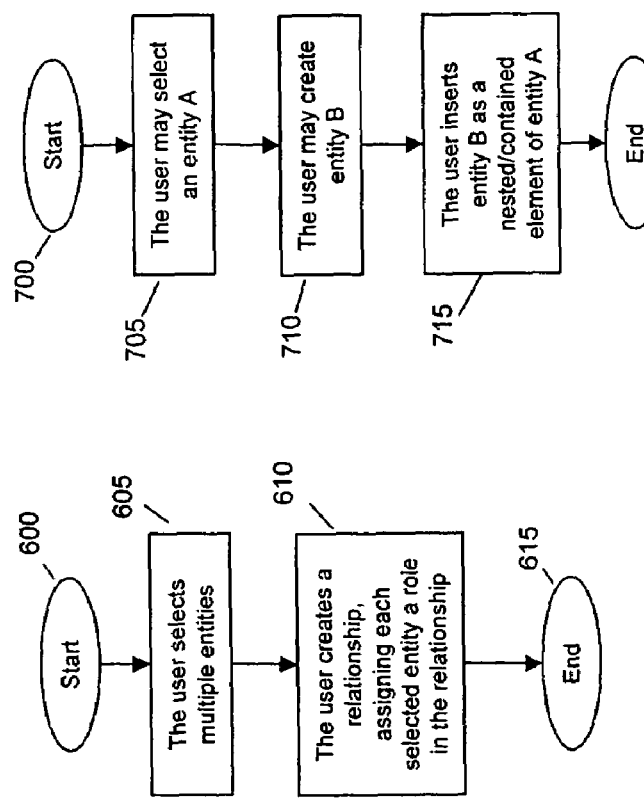
Figure 7A
Figure 6

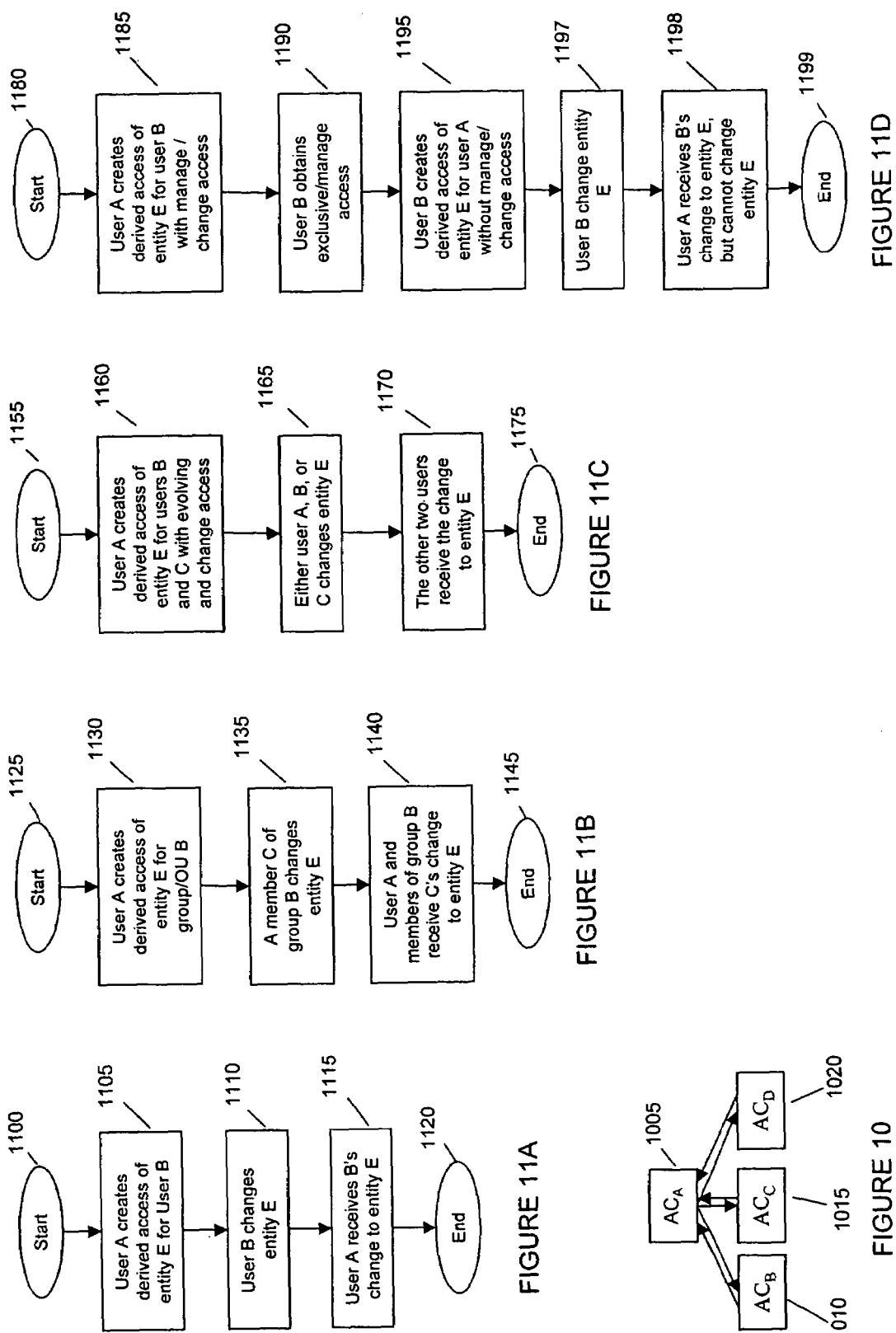
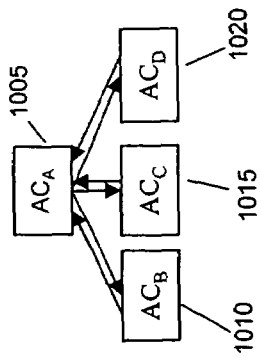

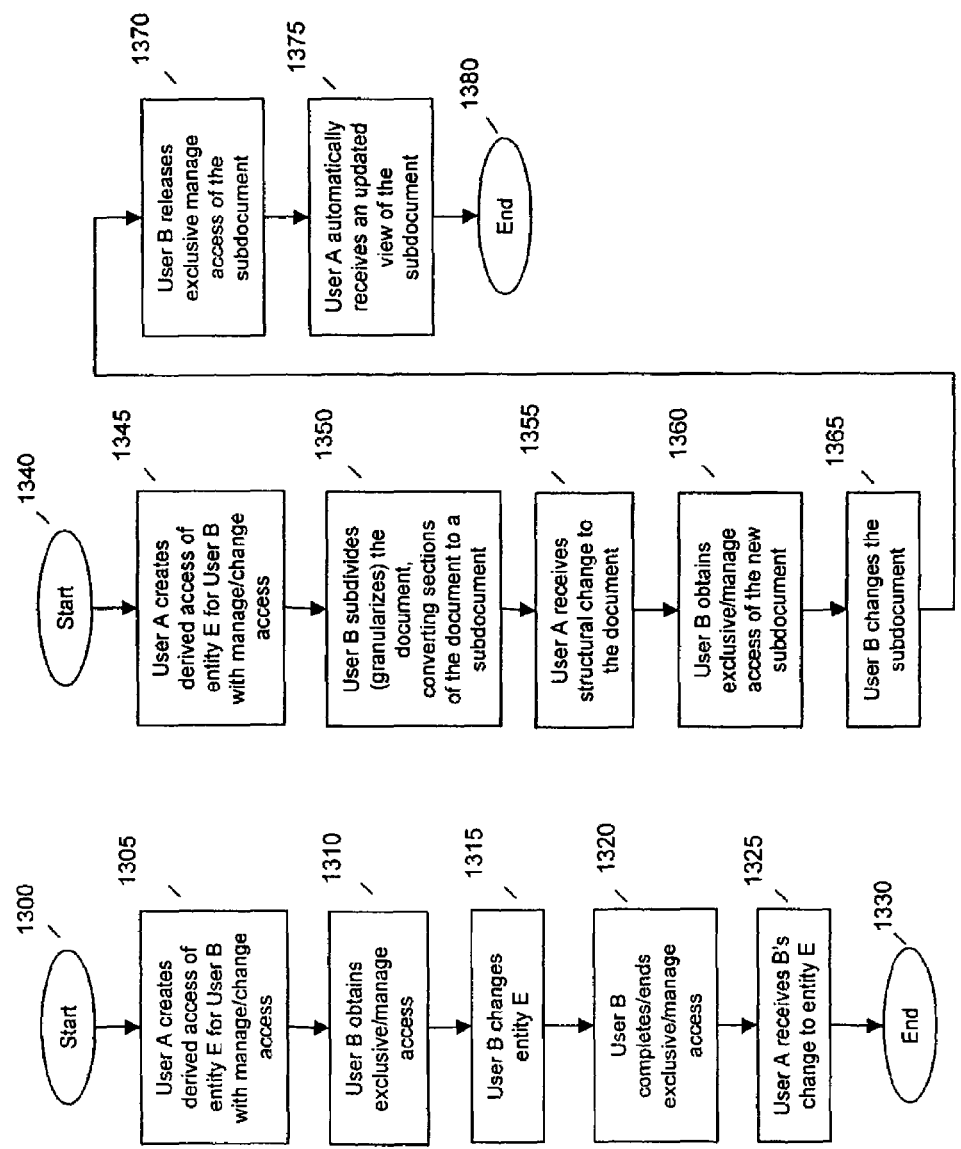
FIGURE 13B
FIGURE 13A
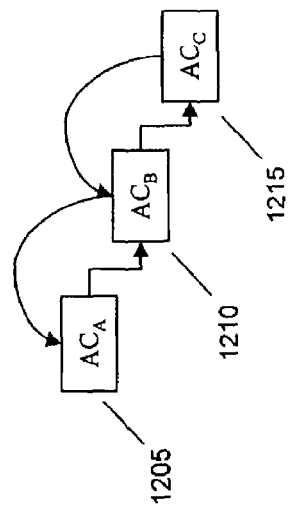
FIGURE 12

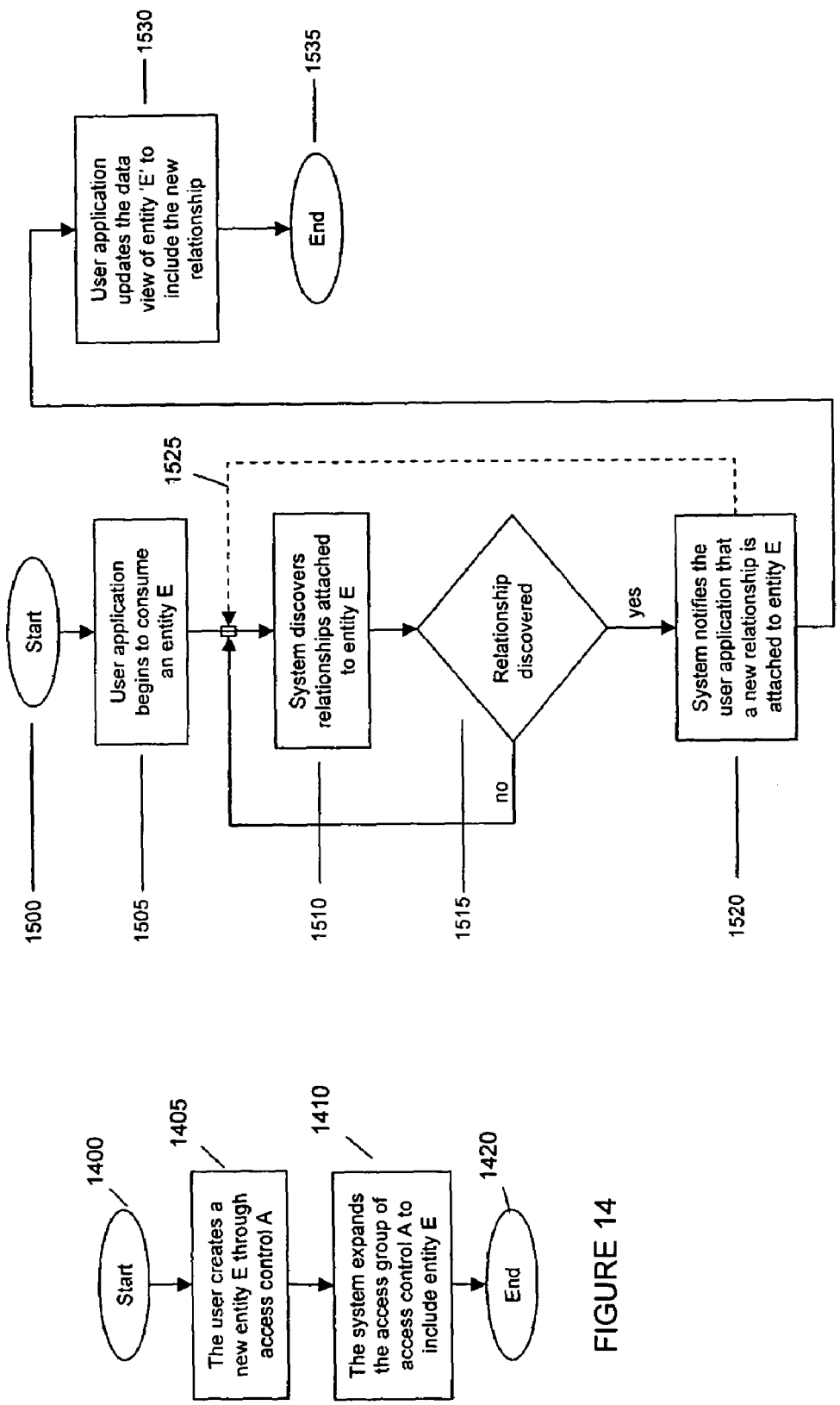

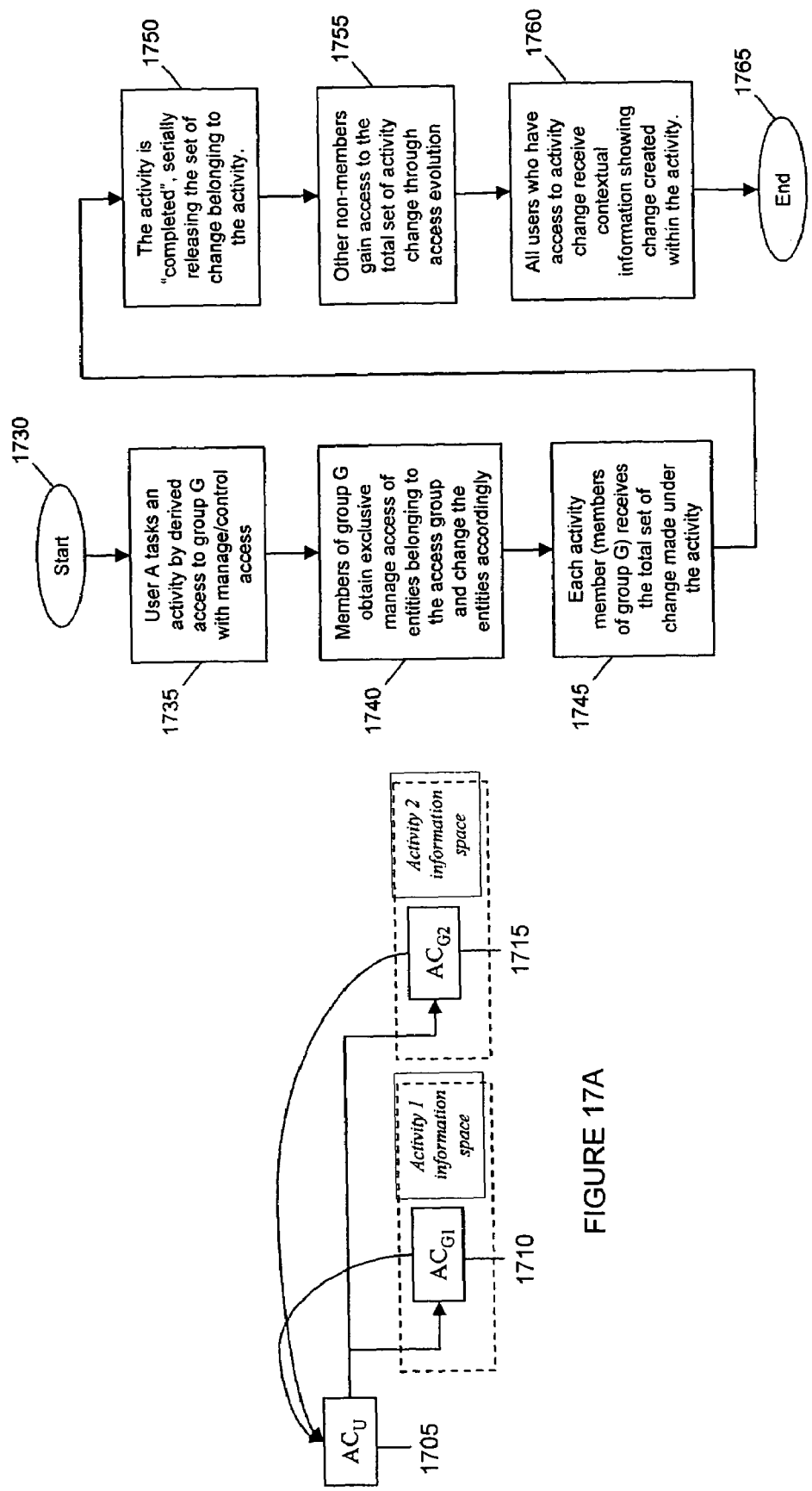

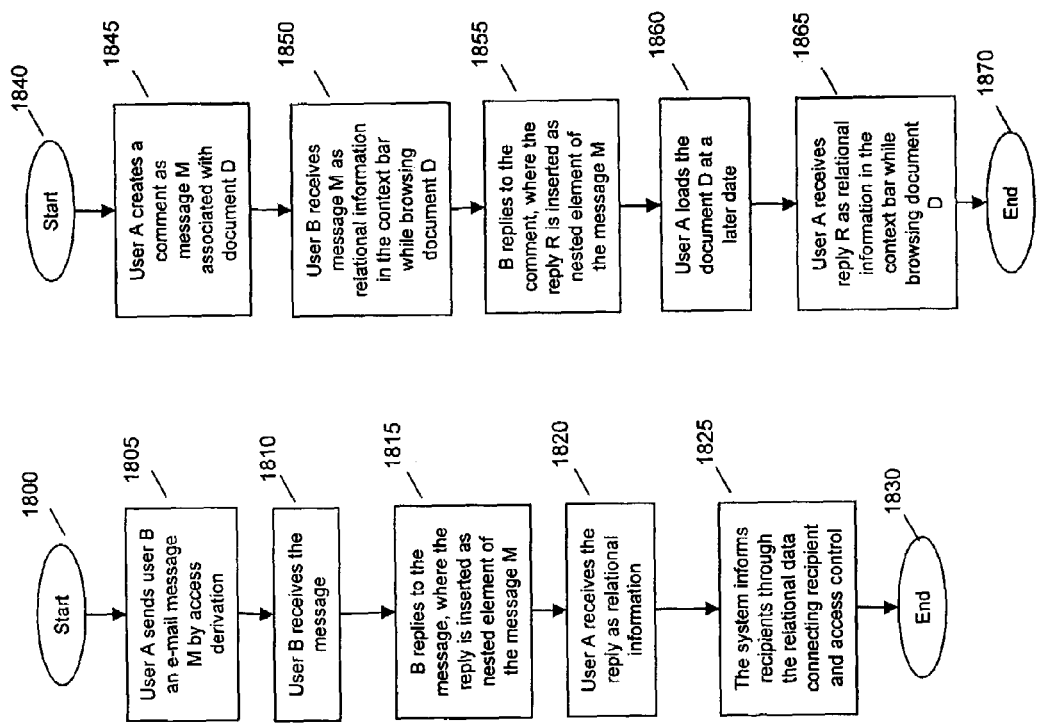

NETWORK OPERATING SYSTEM AND METHOD

CROSS-REFERENCE TO RELATED APPLICATIONS

This application is the National Stage of International Application No. PCT/US2004/008406 filed on Mar. 18, 2004, which claims the benefit of U.S. Provisional Patent Application No. 60/455,739 filed on Mar. 18, 2003, the disclosure of each are incorporated by reference herein in their entirety.

BACKGROUND OF THE INVENTION

1. Field of the Invention

This invention is directed to a system and method of providing collaboration in computer environments and, more specifically, to a system and method of collaborative knowledge work in a computer or network environment.

2. Background Description

In today's world, the concept of collaboration has many different meanings. In attempts to provide some measure of collaborative "knowledge work", the marketplace has fragmented data access systems so that composite and unified sharing arrangements are essentially unachievable. For example (but not limited to), the following technologies are often used in attempts to implement collaborative knowledge work: E-mail, Workflow Automation, Groupware, Peer-to-Peer Collaboration, Enterprise Portal Services, Personal File System, Data Grid.

One aim of collaboration technology may be to increase the productivity of knowledge work. Available technologies have not accomplished this goal. Despite significant investment in collaboration technology, such as those undertaken to various degrees by Groove Networks, Lotus Notes, and Microsoft SharePoint, a leading industry analyst still asserts that "e-mail is used 90-95% of the time when people engage in collaboration." A leading industry executive summed up the problem as: "The best that can be done today is simply using electronic mail where you're just mailing out things, and you get various people proposing edits on those things, and you're trying to pull it back together. There's no real sharing there; there's just e-mail going back and forth."

Another leading industry research group reports that "e-mail is not an efficient interactive tool." And finally, a leading industry research group states that it "does not believe vendors can perpetuate the value-added myth that groupware is anything more than e-mail". In this last quote, groupware is referring to collaborative systems vis-à-vis e-mail. The group concludes by suggesting that "there should be more to collaboration than e-mail."

Two categories of technology currently capture the substantial breadth of available collaboration systems: e-mail and the shared file system. Whereas industry leaders peg e-mail as "the problem" and offer solutions enabling a shared file system, e-mail continues to dominate the market for collaboration. E-mail is not the problem, and the shared file system is not the solution.

The general form of a data and software system today may be a single, static, and hierarchical tree structure. The file system and relational database both typically share this structure.

Good system design today may involve reducing complexity by normalizing data and object structures within a single hierarchy, as a "uniform". Stated simply, the current medium of information work is discontinuous with this result: workers store data, have knowledge, and exchange information. Workers know what they store and retrieve in data systems (pull). They receive what they do not know (information) by explicit means of communication. Thus, what is stored in data systems is not the information product, but a data product. Its value is not stored, but known and communicated by explicit means (such as e-mail and telephone).

If collaboration is a function of information, and not data, then collaboration today is performed by explicit means only, and is not managed systematically. Users directly communicate information based on contextual knowledge of data through e-mail, phone, and at the proverbial "water cooler". Explicit/direct information transfer is largely slow, ad-hoc, unreliable, and incomplete.

Existing computer environments for knowledge work, while frequently labeled information systems, are in fact only data systems. The product of knowledge work is a complex combination of content and context. Knowledge workers currently store the content of data as a file, but remember the data context, the informational component of data. That is, the element of data that is information is not stored in data systems today. Existing data mediums lack the critical element of information: "context".

This explains why the content of existing data systems is largely void of information. These data systems lack the context required to convert data into information. Knowledge workers remember data context, and store data content. A "knowledge gap" then exists by definition between the contextual knowledge of one worker and another (why knowledge workers need knowledge). The knowledge gap is the "unknown unknown" (versus a "known unknown"). The knowledge gap makes information today largely invaluable and unmanageable. The knowledge gap resultantly leads to the hierarchical, top-down structure of knowledge work and organizational hierarchy, and hence, its systematic inefficiency and unmanageability.

Stored data currently lacks the context/information required to interpret data content. As such, the knowledge gap accounts for a lack of knowledge transfer, and ultimately the loss of core value in the knowledge economy. The reality of knowledge work today was recently described by a well know industry executive as "the cess pool that is the file system". A large volume of data, lacking information context, is meaningless. Given the limitations of the human mind, stored data is largely unmanageable and incapable of providing long-term value.

The knowledge gap explains why data systems today are "pull" oriented. Workers pull data out of the system based on their (contextual) knowledge of its content. The knowledge gap also explains why knowledge work is pull oriented beyond computer data systems and is why individuals become information specialists, or contextual knowledge repositories (such as, for example, an attorney with specific knowledge of a client or matter). Knowledge work has remained pull oriented because the only complex data medium presently in existence is essentially the human mind.

As such, while data is managed, information today is unmanaged. The fundamental limitation/flaw of each of the above system as a technique of collaboration may be characterized as follows e-mail:

E-mail is purely decentralized (a decentralized process and product). Context is the central, enabling feature of e-mail based collaboration. The inbox is a unique and private store for each user. A message comprises a unique information context (containing the message and file attachments) for a specified group of recipients. Context may be considered a private information space shared by a group of individuals (context may also describe the component of knowledge currently uncaptured by data systems). E-mail provides superior context by its ease of use and flexibility. Participating in a private information context is simply a matter of creating or replying to a message, with attached files.

However, its "explicit" mode of information transfer induces overwhelming complexity in a collaborative setting. The quantity of explicit information required to coordinate a collaboration increases exponentially with the number of workers (on the order of $2^n$, where 'n' is the number of workers), resulting in information exchange that is slow, ad-hoc, unreliable, and incomplete (and which grows increasingly inefficient with the number of workers or volume of managed information).

Finally, with each file exchanged by e-mail attachment, the collaborative product becomes "dis-integrated". File sets and their constituent versions divide and exponentiate in number across user inboxes and file systems, creating an intellectually unmanageable product and process (work of one individual is frequently lost, unknown, or conflicts with others' work).

The shared file system is purely centralized. As a result, it provides only one context itself. Pure centralization thus sacrifices context in favor of a uniform and shared file structure. But how can two users work on the same document or stage a review cycle? Typically, users resort to e-mail. A single, shared structure is incapable of supporting the requisite context of interaction among workers in a collaborative setting. For example, consider what occurs if a team creates two shared spaces, and accessed by different members. By creating multiple information spaces, the team has simply fragmented, or disintegrated the information product. In gaining collaborative "context" (e.g., a private shared information space), the team typically fragments the collaborative information product and loses continuity. Finally, allowing users to simultaneously edit to a file does not in itself provide context, since there remains only one (albeit shared) information context (e-mail remains the only medium for contextual collaboration).

Serial and parallel work flow in current data management systems remain unreconciled. For example, assuming an information space is currently embodied as a shared file store, recent implementations automatically synchronize a space (in a parallel work flow) by exchanging deltas among members of the space in real-time. Such peer-to-peer systems effectively enable parallel work flow, but miss the necessary element of serial work flow. As a result, knowledge workers resort to e-mail for serial work flow. E-mail allows the staged transfer of files/versions, and as such, is the de facto standard for serial work flow. In this way, work flow is bifurcated between two systems: the shared file store/real-time conferencing technology (parallel work flow) and e-mail (serial work flow).

Those technologies typically identified as "work flow system" (such as, for example, Microsoft SQL Work Flow Designer or InfoPath) require construction of a work flow prior to execution. Such work flow is used to perform repetitive tasks (e.g., billing, accounting, or surveys). However, this system class is effectively (and in practice) excluded from use by knowledge workers, since neither the process nor product of knowledge work can be known before it is performed (that knowledge is required to construct an a priori work flow).

Therefore, knowledge workers are at present stuck with divergent and unreconciled methods of work flow, which neither individually, nor collectively, provide a workable solution. As a result, workers experience "information overload" as they attempt to manually execute work flow, as they attempt to integrate file versions forked and scattered across hard drives distributed via e-mail.

The invention reconciles these deficiencies and introduces a new paradigm for collaborative information management.

SUMMARY OF THE INVENTION

In an aspect of the invention a system and method for maximizing collaborative productivity of knowledge workers is provided. The system and method may include at least one component to logically decentralize a collaborative information process of knowledge workers, to logically centralize a collaborative information product of knowledge workers, and to continuously reconcile the decentralized collaborative information process and the centralized collaborative information product.

In an aspect of the invention a computer program, system, and method for maximizing collaborative productivity of knowledge workers is provided. The computer program, system and method may include at least one component to logically decentralize a collaborative information process of knowledge workers, to logically centralize a collaborative information product of knowledge workers, and to continuously reconcile the decentralized collaborative information process and the centralized collaborative information product.

In another aspect of the invention a complex data medium is provided. The medium may include a means for capturing relational continuity across user work, servers, and networks.

In another aspect of the invention a system, method and computer program of data evolution is provided. The system, method and computer program may include a mechanism and process of unifying change and state within a temporal and relational complex data medium.

In another aspect of the invention an information system, method, and computer program is provided. The system, method, and computer program include an information process that may deliver users the relational evolution and context of data in real-time.

In another aspect of the invention a method, system, and computer program of access evolution is provided. The method, system, and computer program may include a means of derived access and a means of evolving access. The system may provide temporal continuity in the "complex data medium" (CDM) and collaborative work flow.

In another aspect of the invention a method, system, and computer program of a dynamic view is provided. The method, system, and computer program may include a mechanism and process for integrating, mapping, and synchronizing a dynamic view.

In another aspect of the invention a network application architecture, system, and computer program is provided. The architecture, system, and computer program may include an XML view and context bar. The application may be driven bi-directionally by the system and user, which may create a network dynamic among users through system applications.

In another aspect of the invention a unified system, method, and computer program of e-mail and shared file management is provided. The system, method, and computer program may provide a natural mechanism for allowing individual/group collaboration while maintaining data in a continuous and integrated form.

In another aspect of the invention a unified system, method, and computer program of serial and parallel work flow is provided. The unified system, method, and computer program may provide continuous collaboration among users over time and at the same time.

In another aspect of the invention a unified system, method, and computer program of synchronous and asynchronous collaboration is provided. The system, method, and computer program may include a means of reconciling e-mail and instant messaging.

In another aspect of the invention a method and unified system, method, and computer program of security context is provided. The system may provide a mechanism and process of regulating information exchange and lifecycle.

BRIEF DESCRIPTION OF DRAWINGS

FIG. 4 is a functional block diagram of an embodiment showing data evolution;

FIG. 5A is a flow chart of an embodiment showing steps of "changing" an entity by creating a relationship;

FIG. 5B is a flow chart of an embodiment showing steps of "changing" an entity by updating a field of the entity;

FIG. 6 is a flow chart of an embodiment showing steps of the process of linkage;

FIG. 7A is a flow chart of an embodiment showing steps of the process of expansion/granularization;

FIG. 7B is a flow chart of an illustrative embodiment showing steps of the process of expansion/granularization;

FIG. 8 is a flow chart of an embodiment showing steps of the process of expansion/granularization;

FIG. 10 is an illustration showing a process of parallel access evolution;

FIG. 11A is a flowchart of an embodiment showing steps of parallel workflow;

FIG. 11B is a flowchart of an embodiment showing steps of parallel workflow;

FIG. 11C is a flowchart of an embodiment showing steps of parallel workflow;

FIG. 11D is a flowchart of an embodiment showing steps of parallel workflow;

FIG. 12 is an illustration of an embodiment showing a process of serial access evolution;

FIG. 13A is a flowchart of an embodiment showing steps of serial workflow;

FIG. 13B is a flowchart of an embodiment showing steps of serial workflow;

FIG. 14 is a flow chart of an embodiment showing the steps by which the access group of an access control may be expanded;

FIG. 15 is a flowchart of an embodiment showing steps of information delivery;

FIG. 17A is a functional block diagram of an embodiment showing mixed serial/parallel work flow;

FIG. 17B is a flow chart of an embodiment showing mixed serial/parallel work flow;

FIG. 18A is a flow chart of an embodiment showing steps of the process of unified synchronous/asynchronous messaging;

FIG. 18B is a flow chart of an embodiment showing steps of the process of unified synchronous/asynchronous messaging;

DETAILED DESCRIPTION OF EMBODIMENTS OF THE INVENTION

Complex Data Medium

Figure 1:
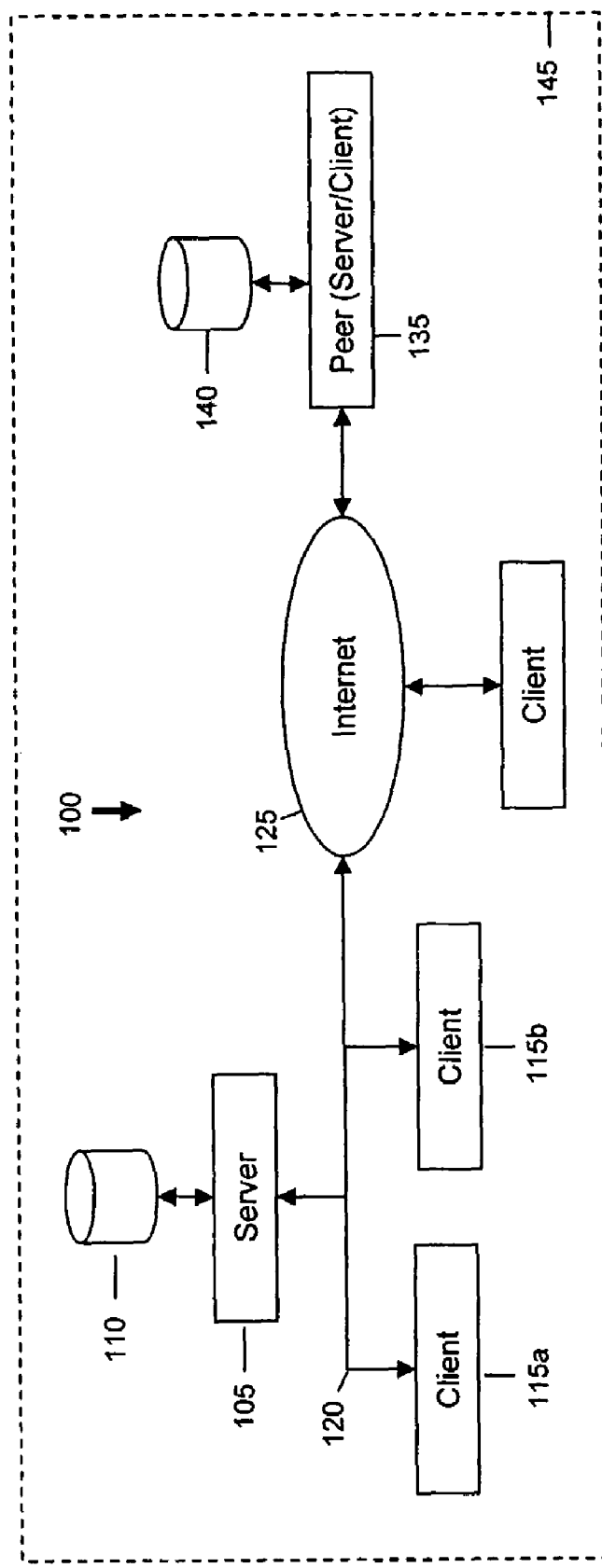
FIG. 1 is a block diagram of an embodiment of the environment of the invention.

FIG. 1 is a block diagram of an embodiment of the environment of the invention, generally denoted by reference numeral 100. However, one of ordinary skill in the art would recognize that the invention may be used in other environments. The environment 100 includes a server 105 having an associated database 110 and a plurality of clients 115 (a, b, c), 130, and 135. Further, the environment includes network 120, which may be a local area network (LAN), wide-area network (WAN), or other network. The Internet 125 interconnects network 120 with the client 130 and the peer 135, which also may have a database 140.

The server 105 and associated database 110 may together persist and manage information and data. The server 105 and database 110 may exist in other variations, as one skilled in the art would recognize. The server may support different network applications (e.g., word processor, enterprise applications, data base applications, or the like). The server 105/135 typically contains the set of data and information accessed by the client. The clients 115/130/135 typically provide the interface through which users (knowledge workers) access a network application. The client may also store and execute software belonging to the network application (e.g., thick client applications, such as word processors) or may also provide the application through a thin client interface (e.g., for the internet browser, terminal services). Client firmware include the PC or thin web client.

The Internet 125 may connect remote clients and peers to the network 120. The remote client may access the network 120 through security mechanisms, including a firewall and virtual private network (VPN). The peer 135 is typically both a server and a client, including the database 140, a server/client 135 within a single unit (e.g., a laptop, having a database stored on its local hard drive, the server stored and executed locally, and network applications stored and executed locally). Servers 105 and 135 are typically called "peers" when they are connected by Internet 125 and network 120. As peers, servers 105 and 135 may jointly manage the "data environment".

The network application is typically driven by both the server and user, enabling bi-directional managed information and implicit collaboration among users, as described further below.

The CDM 145 may logically exist across one or more physical data repositories (may physically reside but is logically one thing). The CDM may be present and pervasive throughout the entire network. The CDM is pervasive as servers execute the method of information, pushing data across the network (e.g., into user view), making it pervasive. The data is complete and self describing within a continuum. Encompassing the entire network and across users, networks, system data, time.

Complex Data Medium

Figure 2:
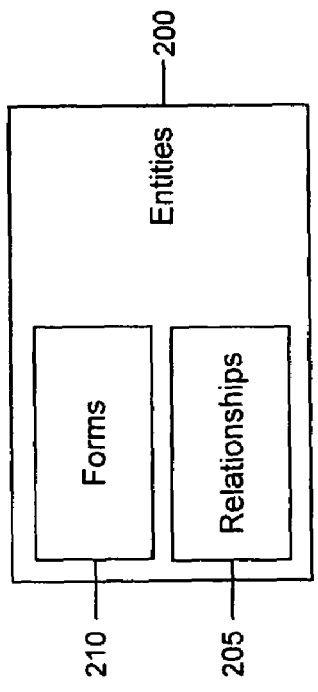
FIG. 2 is a block diagram of the embodiment showing a Venn diagram of entities typically included in the "complex data medium" (CDM)

FIG. 2 is a block diagram of the embodiment showing a Venn diagram of entities typically included in the CDM. The diagram shows the set of entities 200 as containing the set of relationships 205 and the set of forms 210. The form (belonging to set 210) typically describes a "complex data structure". Typically, the form may itself be a complex data structure defining the general structure of a form's "instance". For example, a document form may be a complex data structure which defines a document instance as containing a set of subdocuments. The form typically defines both a set of "fields" contained by an instance of the form and a set of "elements" contained by a form instance.

The set of fields typically comprises a k-tuple of data components each having a textual identifier. A field is typically defined as containing data of a given type, including binary (e.g., an application image), boolean, date/time, decimal, globally unique identifier (GUID), integer, reference, string, time span, XML (Extensible Markup Language), or the like. Each field may be considered an "attribute" or "property" of a form's instance.

The set of elements typically comprises the hierarchy of elements contained by a form. An element typically defines the form of an instance as it is contained within the hierarchy. The element is typically contained by the root form or another element belonging to the hierarchy. Elements may be used in combination to define the form of a complex data structure. For example, a "subdocument" element of the "document" form may allow or require a document instance to contain a "subdocument". The element may impose further restrictions on the "content model" of the form, such as the number of element occurrences allowed in an instance of the form. The structure of a form may include certain "groups", such as choice and sequence, which allow the user to further specify the content model.

The CDM includes form derivation, which may allow the structure of one form to derive one or more other forms. In certain aspects, the derivation structure of the CDM may be analogous to concepts of the object-oriented programming model (OOP). Derivation typically allows a form to inherit fields and elements of each base form. For example, a form typically includes its fields and elements plus the fields and elements of its base form(s). The relationship may also be specified, allowing an element of a form to override (or replace) an element belonging to a base form.

The structure of an entity may typically be defined by a form. The form of an entity typically includes a globally unique identifier GUID field (identified as "Entity:UID"), enabling continuity of the CDM across networks, including the Internet.

As FIG. 2 illustrates, the relationship is typically a kind of entity (deriving the form of the entity), since the set of relationships 205 may belong to the set of entities 200. As FIG. 2 also illustrates, the form is typically a kind of entity (deriving the form of the entity), since the set of forms 210 may belong to the set of entities 200. In this way, the CDM is self-describing, since the complex data structure defining a form and the complex data structure of a form's instance (e.g. a document instance) may both exist within a common structure, the CDM.

The process of building up a form typically involves building a new form out of existing ones. At the beginning of the process, the user typically combines primitive types that may be built into the system (e.g., for example, integer or string). The system database typically has tables corresponding to each element of the "System:Forms", "System:Elements", "System:Fields" (and other elements of the form), since each instance is typically itself an entity. Therefore, creating a new form typically results in a new instance of a Form entity (typically stored as a record in the "System:Forms" table), as well as additional Element entities that may be contained by the Form (typically stored as records in the "System:Elements" table), as well as additional Field entities that may be contained by the Form (typically stored as records in the "System:Fields" table), as well as other entities that may be contained by the form structure (e.g., including the content groupings Choice and Sequence), as well as containment relationships typically creating the complex data structure of a form (typically stored as records in the "System:Containment" table), as well as any base relationships that may connect the form entity with base forms or form elements with base elements (typically stored as a record in the "System: Base" table), and so on.

Creating a new form typically also prompts the system to create the database table that may contain entity instances of the form. A database table typically embodies the entity instance of a form. The database table typically comprises a set of columns corresponding to each field of the form. The database table is typically automatically created by the system when the new form is defined (e.g., when the complex data structure of a form and elements is created). The table's name typically adopts the qualified name of the form (e.g., "System:FormName"). An entity instance of the form may then be contained as a record in the table corresponding to the form. Elements of an the instance of a form instance are typically connected to the instance of a form by containment relationships. For example, a containment relationship may connect a document instance (whose form is document) with its nested subdocument(s) (which may be defined as element(s) of the document's form).

The CDM comprises a graph/network of entities and relationships. The entity may be an anchor of reference, or relationship target (the relationship may be implemented as an entity subtype). The entity may have a set of properties/fields/attributes. The relationship may be a k-tuple, wherein each member may be a reference to a target entity or a literal value. The meaning of an entity may typically be defined by relationships connecting it with other entities. To this extent, as an entity may be defined vis-à-vis other entities, the relationships define both meaning and context of the entity.

Data Evolution

The CDM may be an evolving and temporal medium. The medium reconciles change and state. The entity may typically be the unit of state. The relationship may typically be a unit of change and time. To the extent that a relationship may be an entity subtype, it becomes a part of the data state. Entities and relationships are created but are not necessarily destroyed; they may be immutable and cumulative.

The "process of change" or "data evolution" in the CDM may be largely driven by the addition/negation of relationships. For example, an entity typically changes when a relationship is added for which it is a member target/reference. In this exemplary case, the relationship is the change, and the target entity, is that which is changed. The entity may also be considered as changing by transitive association with other entities, through association with any entity belonging to the same graph (with which the entity is associated). The process of change in the CDM may also be driven by the creation/addition of entities.

The relationship may record the time at which it is added to the graph. At the conclusion of a relationship between entities, a relationship may be negated. Negation is the additive inverse of creating a relationship, effectively canceling out a relationship, while not necessarily deleting it (an embodiment may structure negation as a property containing the time at which negation occurs). If each relationship is considered a term, and addition/negation the term's sign (positive or negative), then the state of an entity at time 't' may be considered the sum of all relationships up to time 't'. In other words, summing change yields state. This may be considered the relational algebra. This captures the notion of an "evolving data system".

Figure 3:
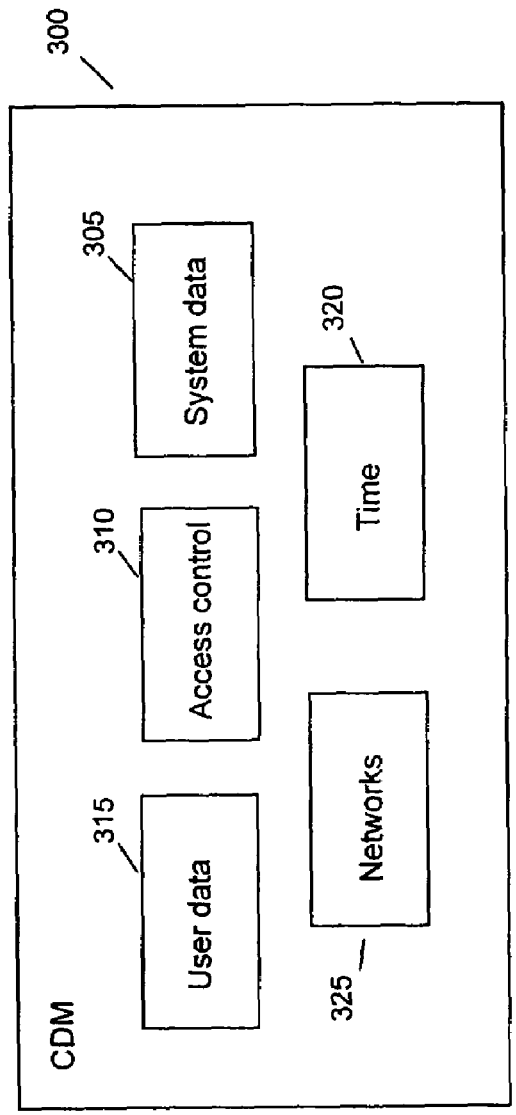
FIG. 3 is a logical block diagram showing components and elements of a CDM.

FIG. 3 is a logical block diagram showing components and elements of a CDM, generally denoted by reference numeral 300. The CDM encompasses, but is not limited to, system data 305, access controls 310, user data 315, time 320, and networks 325. The CDM unifies and integrates at least these various aspects.

FIG. 4 is a functional block diagram of an embodiment showing "data evolution", starting at step 400. By way of example, FIG. 4 illustratively shows the process of temporal, "data evolution" in the CDM of a folder as it changes over the course of a week. According to this example, on Sunday, folder 400, document 420, document 425, and document 430 exist as unrelated entities. On Monday, the document 420 is "inserted" in the folder 400 via the containment relationship 405. On Tuesday, the document 425 is inserted in folder 400 via the containment relationship 410. On Wednesday, the document 430 is inserted in folder 400 via the containment relationship 415. In this case, each relationship stores the time at which it was "added" to the CDM. As FIG. 4 depicts, the folder 400 "evolves" over the cited period through relationships, which capture both the change and state of the folder system (whose root is folder 400). It is said that Folder 400 "changes" vis-à-vis documents 420, 425, and 430 through relationships 405, 410, and 415.

If on Thursday, document 430 is removed from folder 400, the relationship 415 is not necessarily deleted. Rather, the negated bit of the relationship 415 is changed from its default value (false) to true. To integrate the current state of the folder 400, the system may treat each relationship/entity pair in a way analogous to algebra, such that the current "sum" of folder 400 is the document 420+document 425+document 430−document 430, or by canceling out the negated document 430, document 420+document 425 (or the set {document 420, document 425}). Note that neither Document 430 nor Relationship 415 has been deleted from the CDM following the "removal" of Document 430. To compute the state of the folder 400 immediately preceding the negation of Document 430, the system "sums" the previous set of terms (not including "−document 430") arriving at document 420+document 425+document 430 (or the set {document 420, document 425, document 430}). One of ordinary skill in the art would recognize that the example of FIG. 4 is not limiting, and in fact, may easily include other varying scenarios which may be very complex.

FIG. 5A is a flow chart of an embodiment showing steps of "changing" an entity by creating a relationship, starting at 500. FIG. 5A (as well as all flowcharts herein) may equally represent high-level block diagrams of components of the invention implementing the steps thereof. The steps of FIG. 5A (as well as all flowcharts herein) may be implemented on computer program code in combination with the appropriate hardware. This computer program code may be stored on storage media such as a diskette, hard disk, CD-ROM, DVD-ROM or tape, as well as a memory storage device or collection of memory storage devices such as, for example, read-only memory (ROM) or random access memory (RAM). Additionally, the computer program code can be transferred to a workstation over the Internet or some other type of network.

Continuing with FIG. 5A, at step 505, an actor may choose a set of entities to relate. For example, the actor may choose to instruct the system to insert a document in a given folder. At step 510, the actor may instruct the system to insert the containment relationship linking the folder as containing entity (parent) and the document as the contained entity (child). If this action is allowed, it causes a "change" to the folder entity. At step 515, the process ends.

FIG. 5B is a flow chart of an embodiment showing steps of "changing" an entity by updating a field of the entity, starting at 530. At step 535, an actor may choose the entity and field to update. For example, the actor may choose to instruct the system to update the field "name" of a document entity. At step 540, the actor may instruct the system to update the given field with a given value. If this action is allowed, it causes the entity's field to update. At step 545, the process ends.

Reconciling Physical Centralization & Decentralization

Prior to the invention, data systems fall under several categories of physical data location. The client Client-Server method is centralized, serving data from a central server. The peer-to-peer (P2P) mechanism is decentralized, replicating or sharing data across a distributed array of data storage systems.

The invention may reconcile physical data centralization & decentralization by including a method of identifying entities by a globally unique identifier. Unlike the World Wide Web (prior to the invention), the entity's unique identifier (UID) is not typically based on the data's physical location. Rather, the UID may be generated randomly with global uniqueness (for example, an embodiment may be the System.Guid.New Guid( ) method included in Microsoft's .NET framework). Each entity may then be identified by its associated UID (an embodiment may include UID as a field in the "form" definition of the entity).

The invention may provide for essentially any system (e.g., a PC or a Server) to become a system site. System sites may persist and manage data and participate in a distributed P2P configuration (decentralized). That site may simultaneously assume the role of server or client in the (centralized) client-server configuration (wherein the client accesses data remotely managed by a server).

As a result, the invention may decouple the logical structure from the physical structure (i.e., location) of data. This allows the platform to automate, fully, the physical placement of data and its replication/synchronization. The manner of data placement/replication/synchronization may be optimized by the system on the basis of one or more:

(a) Security considerations: The system may hold data behind a firewall for purposes of security, or establish one trusted server as the access point for employees accessing data remotely.

(b) Efficiency considerations: The system may replicate and synchronize data across multiple platform data sites, to reduce latency and guarantee quality of service (QoS). The system may execute QoS constraints specified by the administrator or automatically determined by a user work load requirements.

(c) On-line, Off-line: The system may replicate data on sites which are expected to go off line. For example, the system may automatically replicate data onto a user's laptop (participating as a system site), so the user has access to files when disconnected from the network.

The Process of Complexity and Data Continuum

The invention establishes and provides a "process of complexity". The process may be driven by a computer managed environment (the "environment", "operating environment", "network operating system", "system", "platform", or "platform environment") in which data and information consumers ("actors") participate (receive, process, and create information/data) in CDM managed by the environment.

In one aspect, the invention defines complexity as relational density in a data structure. A function of the system, according to the invention, may be to increase data complexity, on the basis that data manageability is a function of complexity. The process of complexity may have the effect of creating a "data continuum" in the CDM. The process of complexity may occur through the following operations, including linkage, expansion/granularization, and contraction/unification (contraction and expansion may considered symmetric elements of the process of complexity). These operations have the effect of increasing complexity and continuity of a given CDM, for example:

Linkage:

Relational linkage includes the process of creating new relationships. The effect of linkage includes driving information and data value transfer, since relationships may serve as entity "attractors". That is, the effect of linkage includes maximizing the visibility of entities of perceived value, while minimizing the visibility of little perceived value. Linkage adds new relationships to the information network, increasing relational density. Linkage may drive information transfer, as relationships serve as entity "attractors". Linkage promotes entities of value, and eliminates entities of little value over time. Linkage may ultimately be a process of contraction, increasingly collapsing the space upon itself as a data continuum.

FIG. 6 is a flow chart of an embodiment showing steps of the process of linkage, starting at step 600. At step 605, the user may select multiple entities to link relationally. At step 610, the user may create a relationship, assigning each selected entity a "role" in the relationship. For example, the user may select a folder entity and a document entity and create a containment relationship linking each entity as parent and child (their role names), respectively. At step 615, the process ends.

Entity Expansion/Granularization:

Entity "expansion" or "granularization" includes the process of increasing the number of entities by subdividing an object/concept (such as, for example, labor, or a document, or the like) as multiple entities, increasing the potential linkage (and thereby increasing the relational density over time). For example, a user may subdivide a document as a collection of one hundred documents, each serving as a site for relationships. Granularization increases the precision of information. Granularization is also a logical extension of the evolution of thoughts and ideas.

FIG. 7A is a flow chart of an embodiment showing steps of the process of expansion/granularization, starting at step 700. At step 705, the user may select an entity A. In step 710, the user may create an entity B. At step 720, the user may insert entity B as a nested/contained element of entity A (through a containment relationship). At step 720, the process ends.

FIG. 7B is a flow chart of an illustrative embodiment showing steps of the process of expansion/granularization, starting at step 750. At step 755, the user selects subsection S of document D. At step 760, the user creates a subdocument entity M containing the content of subsection S (as a substitute for subsection S). At step 765, the user inserts subdocument M as a nested/contained element of document D. At step 770, the process ends. This example shows expansion/granularization by dividing the document into multiple logical components.

Entity Contraction/Unification:

Unification, according to the invention, includes the process of the entity contracting, or collapsing upon itself. This may occur as multiple entities are combined as one. For example, if attorneys discover that several legal documents serve the same function, they may substitute the group of documents with a single instance. Unification includes the effect of increasing the data continuity.

FIG. 8 is a flow chart of an embodiment showing steps of the process of unification/contraction, starting at step 800. At step 805, the user may select an entity A. In step 810, The user may substitute an entity for the plurality of entities. At step 820, the process ends. When the user "substitutes" an entity A for a plurality of entities, the relationships linking the plurality of entities are typically remapped to the entity A. This remapping causes the unification of entities.

The process of complexity may substantially contribute to the formation of a "data continuum". Prior to the invention, the simple structure of existing data systems fragments and dis-integrates data (for example, file copies, versions, messages, stand-alone data stores, networks). The invention allows the complex medium to evolve as a network of information that typically becomes (with increasing continuity) increasingly consistent, complete, correct, self-describing, and closed (engulfing network externalities). The process may also include the effect of eliminating data inconsistency and redundancy.

An aspect of the "data continuum" is its effect on productivity. The continuum includes the effect of driving implicit collaboration among knowledge workers; a dimensional "force feedback", induced by the "intersection" of information product and process. For example, as users work within the same space, the intersection of data through relationships may force the alignment and normalization of their individual processes and work product, dramatically increasing productivity.

Access Evolution

An "evolving access" model provided by the invention may allow "actors" (e.g. users, groups, components, organizational units) to gain access to data and information through "access derivation". "Access derivation" typically includes a hierarchy along which access permission is created and flows/evolves. Each node in the hierarchy may be an "access control", providing an actor (e.g., user) access to a set of entities (the "access group"). An access control may "derive" access through a relationship connecting to a "base" access control. An embodiment of the invention may create the system as the root actor in the hierarchy of derived access.

Access derivation typically includes a process of extension. For example, a user A may extend his/her access to another users/group B. User B may in turn extend access to other users/groups, if the user A set a transfer bit allowing her to do so. The bits the user A may have set include "change", "manage", "evolving", "transfer":

Change: Specifies whether the consumer is allowed to change an entity belonging to the access group.

Manage Access: Specifies whether the consumer is allowed to gain exclusive access of one or all members of the access group (e.g. the consumer gets an "exclusion" on entity A).

Evolving Access: Specifies whether the consumer receives change from the base

Transfer: Specifies whether the user is allowed to extend access, creating derived access controls The derivation hierarchy may exist as a data structure within the CDM (as a part of the "data continuum") and may be constructed as a set of the following entities and relationships:

Access Control (entity): The access control entity, including in its form a base access control, flags/bits specifying access permissions, and the actor to which access may be granted.

Consumer (relationship): The consumer relationship connects the entity with access control (creating the link between consumed entity and consuming actor/organizational unit).

Base (relationship): Creates the link of derivation between the base access control and derived access control.

Knowledge work is largely a process of change. The flow of change includes two forms: in parallel and serially. Serial work flow includes the staged transfer of change along a linear path, i.e., from one space to the next. Parallel work flow includes the transfer of change within a space (typically among members of the space).

The invention provides a method of reconciling/unifying serial and parallel workflow. Such unification includes an evolving access control model (or "evolving access") built within the CDM. The method of unification includes the coupling of evolving access and evolving data. Members of an information space participate in parallel work flow as the environment automatically propagates work among member views in real-time. Users and groups sequence work (staging information flow) in an automated process of serial work flow. The following sections describe embodiments that perform parallel and serial work flow.

Access may evolve in parallel and serially. Parallel evolution may occur as members of an information space create change (the product of work). Those changes (relationships with attached entities) may then automatically become available to other members of the space, and their views continuously updated in real-time. The space in which parallel evolution occurs may be called an "information space", since a user may share access to all change made in the information space. Serial evolution may occur as members "complete" work they have been assigned or have obtained by derived access. Those changes made by the member, which typically belong to the access group of the member's access control, may then automatically be transferred to base access controls and derived access controls according to the 'exclusion' and 'evolving' bit. The 'exclusion' bit typically prevents the flow of change to a base access control until the work is completed (when the exclusion bit is reset). However, change typically continues to flow to derived access controls during that period (or when the exclusion bit is false) if the 'evolving' bit of those derived access controls is set as true.

A recursive mechanism enables combinations of serial and parallel work flow that are powerfully complex, while systematically automated by the invention.

FIG. 10 is an illustration showing a process of parallel access evolution. By way of example, a user A, having access to an entity through access control ($AC_A$) 1005, creates derived access for three individuals (B, C, and D). Those individuals (i.e., B, C, and D) obtain access through access controls 1010 ($AC_B$), 1015 ($AC_C$), and 1020 ($AC_D$), which each derive access control 1005. User B gains access to the entity through access control 1010. User C gains access to the entity through access control 1015. User D gains access to the entity through access control 1020. User A may specify that access controls 1010, 1015, and 1020 have "evolving" access. The four users then belong to an information space including access controls 1005, 1010, 1015, 1020, since every change made by any given user of the group (A,B,C,D) immediately becomes available to the other three. The flow or evolution of access in this example may occur as follows: user B makes a change to the entity through access control 1010. Because no exclusion may exist for access control 1010 on the given entity, the change may evolve its derived access control 1005. When the access group of access control 1005 expands to include the user B's change, the system checks whether derived access controls "evolve". Since user A set access controls 1015 and 1020 as evolving ("evolve" bit), the access group of access controls 1015 and 1020 may immediately expand to include user B's change. The views of user A, C, D may immediately update to include user B's change, illustrating parallel work flow.

FIG. 11A is a flowchart of an embodiment showing steps of parallel workflow, starting at step 1100. At step 1105, user A may create derived access of entity E for user B. At step 1110, user B may change entity E. At step 1115, user A may automatically receive B's change to entity E. The change is typically received in real-time by the dynamic view through the process of access and data evolution. The view will typically automatically update to reflect the change. At step 1120, the process ends.

FIG. 11B is a flowchart of an embodiment showing steps of parallel workflow, starting at step 1125. At step 1130, user A may create derived access of entity E for group (organizational unit) B. At step 1135, a member C of group B may change entity E. At step 1140, user A and members of group B may automatically receive C's change to entity E. Members of a group (B) typically receive any access granted to the group (B). At step 1145, the process ends.

FIG. 11C is a flowchart of an embodiment showing steps of parallel workflow, starting at 1155. At step 1160, user A may create derived access of entity E for users B and C with evolving and change access. At step 1165, either user A, B, or C may change entity E. At step 1170, the other two users may receive the change to entity E. Users B and C may typically receive each other's change since access may freely/bi-directionally evolve in the tree containing access controls A, B, C. For example, when B makes a change, the change typically expands the access group of the derived access control (X), since no managed exclusion is held by access control B in the example. Access control C would then typically evolve to include the change since the 'evolving' bit of access control C is true in this example, thus demonstrating parallel work flow. At step 1175, the process ends.

FIG. 11D is a flowchart of an embodiment showing steps of parallel workflow, starting at 1180. At step 1185, user A may create derived access of entity E for user B with manage/change access. At step 1190, user B may obtain exclusive/manage access. At step 1195, user B may create derived access of entity E for user A without manage/change access. At step 1197, user B may change entity E. At step 1198, user A may receive B's change to entity E, but cannot change entity E. In this example of parallel workflow, the recipient of derived access to an entity may obtain exclusive access of the entity, which may typically deny other users (e.g. user A) evolving access to the entity. But in this example, the user may provide read-only access back to user A (e.g. for purposes of review by user A), which may demonstrate parallel workflow. At step 1199, the process ends.

FIG. 12 is an illustration of an embodiment showing a process of serial access evolution. By way of example, a user A, having access to an entity through access control 1205, creates derived access for user B through access control 1210 (deriving access control 1205). User A specifies that user B through access control 1210 has "manage" access. Upon receiving access, user B uses manage access to gain exclusive access (an exclusion) of the given entity. User B then, having access to an entity through access control 1210, creates derived access for user C through access control 1215 (deriving access control 1210). User B specifies that user C through access control 1215 has "manage" access. Upon receiving access, user C uses manage access to gain exclusive access (an exclusion) of the given entity. User C then may change the given entity. Since an exclusion exists on the given entity, the change does not immediately evolve, expanding access by controls 1210 and 1205. Rather, the user C may continue to make change until work is completed, at which point the user C stops managing the entity (releasing the exclusion). At this point, the system may automatically expand the access of control 1210 through serial work flow, including all change made by user C to the given entity. The access control's access group may be "expanded" to include all entities created by user C in the course of doing work. However, in the same way, access control 1205 does not immediately expand, since an exclusion still exists on the given entity by access control 1210. Only after user B has reviewed/altered user C's work (which was tasked to user C) does user B release the manage exclusion, at which point access control 1205 expands to include the serial effort (sum change) of users C and B, illustrating serial work flow.

FIG. 13A is a flowchart of an embodiment showing steps of serial workflow, starting at 1300. At step 1305, user A may create derived access of entity E for User B with manage/change access. At step 1310, user B may obtain exclusive/manage access. At step 1315, user B may change entity E. At step 1320, user B may complete/end exclusive/manage access. The user may "complete" manage access by releasing the exclusion. At step 1325, user A may automatically receive B's change to entity E. The relation change is typically received in real-time. At step 1330, the process ends.

FIG. 13B is a flowchart of an embodiment showing steps of serial workflow, starting at 1340. At step 1345, user A may create derived access of entity E for user B with manage/change access. At step 1350, user B may granularize an entity, expanding the entity into a collection of multiple entities (from a conceptual standpoint). For example, a document may be "subdivided" as a set of contained subdocuments. At step 1355, user A may automatically receive structural change to the entity (e.g., the user may receive an updated view showing the granularization). At step 1360, user B may obtain exclusive/manage access of the new granular subentities of the entity (e.g. a subdocument). At step 1365, user B may change the granular subentity. At step 1370, user B may release exclusive manage access of the granular subentity. At step 1375, user A may automatically receive an updated view of the subdocument. At step 1380, the process ends.

Creating change (in the form of new entities) through derived access may automatically expand the access group (under the access control used to make the change). FIG. 14 is a flow chart of an embodiment showing the steps by which the access group of an access control may be expanded, starting with step 1400. In step 1405, the user may create a new entity E through access control A. At step 1410, the system may automatically expand the access group (G) of access control (A) to include entity E. For example, if user changes entity Y by first creating and then "inserting" entity E (via a containment relationship R also created through access control A), the system may typically expand the access group to include both relationship R and entity E. At step 1420, the process ends.

Process of Information

The personal computer (PC) is often considered the domain of knowledge work, which is complex. The distinction between structured and unstructured remains because no data structure has yet achieved the requisite complexity to store the complex product of knowledge work. While the relational database is structured, its structure is too simple to contain the product of knowledge work ("simple data medium"). It is also static relational structure, vs. the dynamic relational structure that may capture the product of knowledge work. Existing (simple) data systems may contain "unmanaged information", but do not include "managed information". An example of managed information is actual relationships stored in the data medium which capture the relational context and meaning of data.

The invention establishes "context" as the relational component of data that may capture and convey contextual information. This is the meaning of "information-bearing data". Prior to the invention, such contextual data is not typically stored; it is remembered by knowledge workers and communicated by explicit means of information, such as, for example, e-mail.

An aspect of the invention includes a computer managed "complex data medium" (CDM), a network of information-bearing data. The invention dramatically increases productivity on the basis of the relational complexity that becomes the informational component of data. Such "complexity" becomes the relational data "context" of data content. The invention maintains "relationships" (or "managed relationships") as the vehicle of complexity, and by extension, managed information. The invention serves to increase data complexity through interaction by multiple knowledge workers within a common information space. The invention fosters the cumulative effect of complex data, that is, compound value creation though a scalable information process.

The invention provides an "information system" (the "platform" or "platform environment") as a mechanism for managing and delivering stored information. The information system establishes "implicit information" as the catalyst of collaborative knowledge work. Implicit information includes relationships delivered to the user as they are created. For example, when a user inserts a document into a folder, a new containment relationship typically connects the parent folder with child document. The new relationship may be delivered as implicit information to any user "consuming" (e.g., viewing, accessing, updating, or the like) the folder, whose view of the folder is updated. When a user sends e-mail within the information system, an access relationship may be created associating the message and recipient. The information system may deliver implicit information when it notifies the recipient of the new message received.

Prior to the invention, knowledge workers communicate information and coordinate the process of knowledge through direct and explicit means of information. The interaction is direct, worker-to-worker. However, the invention provides indirect coordination (worker-"information system"-worker) of knowledge workers through implicit information. As a result, to work in the complex data medium is to collaborate. For example, since users share a common information space, relationships created by one user may impact the process of another user, hence aligning their view of the information product, or allowing them to collaborate implicitly. Or, since user action is induced by his view of the information product—by allowing users to occupy the same information space, they become aligned implicitly in their collaboration. Information transfer is the "consumption" of relational information created by other users, allowing the alignment and efficient collaboration to exist between users. By making information transfer an implicit/inherent part of working with the CDM, the invention establishes knowledge work as inherently and systematically collaborative. Managed information becomes the catalyst of collaboration, product coherency, efficient process coordination, and organizational productivity.

FIG. 15 is a flowchart of an embodiment showing steps of information delivery (a component of the process of information), starting at 1500. At step 1505, the user application may begin to "consume" an entity E. For example, the user may select, browse, or begin to edit the entity. The "consumer" may be considered the recipient of the process of information. At step 1510, the system may discover relationships attached to entity B. At step 1515, if the system discovers a relationship (including any new or existing relationship), it typically proceeds to step 1520; otherwise, it typically returns to step 1410. For example, the system may discover a relationship (or relationships) associating a document consumed by the user with a comment/message, providing this comment/message as relational information. At step 1525, the system may notify the user application that a new relationship is attached to entity E. The system typically provides this notification in real-time or near real-time. The system typically "pushes" information to the consumer (e.g., the application/user). At step 1525, a parallel process (marked by a dotted line) may automatically return to step 1510, awaiting further relational information. At step 1530, the user application may automatically update the data view of entity 'E' to include the new relationship. At step 1535, the process ends. An actor may also "discover" relational information through a mechanism providing relationships connected to a given entity. The invention includes this form of discovery as a component of the information process. For example, a user may instruct the system to discover relationships connected to a certain entity (and may apply parameters to the search). The user may receive back a set of relationships, for example, showing every folder which contains the specified document through a containment relationship.

Figure 16:
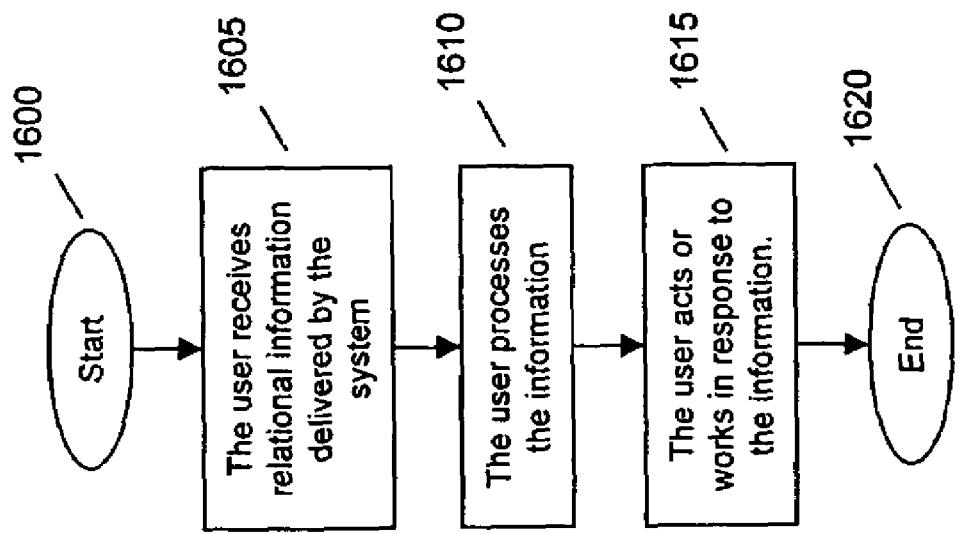
FIG. 16 is a flowchart of an embodiment showing steps of the user's response to information.

FIG. 16 is a flowchart of an embodiment showing steps of the user's response to information (a component of the process of information), starting at 1600. At step 1605, the user may receive relational information delivered by the system. For example, the user may receive contextual information showing the working subdocument as associated with a set of notes recorded as metadata (describing the meaning of the subdocument). At step 1610, the user may process the information. At step 1615, the user may act or work in response to the information (including browsing target entities of relational information). On the basis of information provided (as a component of the information process), the user may typically become more aligned with the collective product and process of collaborative knowledge work. As a result, the system may substantially increase the productivity of knowledge workers. The process ends at step 1620.

Network Application Rearchitecture

The invention may provide for a computer application (such as, for example, a word processor) to evolve from a unidirectional (one-way) to a bidirectional (two-way) data processor. The application may become a bidirectional medium since it is driven by both the user and the platform. Applications currently reach into a platform through the platform's application programming interface (API) (pull). However, the invention establishes the bidirectional channel, such that platform may also reach into the application, delivering information/direction (push). As such, the platform API may become a bi-directional data environment. In this way, the environment allows, in effect, the work of all users to reach into the environment of any single user.

An embodiment of the bidirectional interface may include the dynamic view. An embodiment of the dynamic view may be an XML projection ("XML View") of the CDM. The XML View is typically consumed by an application. The XML View may present a flat, hierarchical projection of relational data of the CDM. The XML View may use the document object model (DOM) as a universal representation for the XML View. The XML View typically maps entities to XML Elements and the relationships to the parent/child containment structure. The view is typically automatically integrated by the environment along a set of axes (such as containment and time), typically as a dynamic view, and is typically synchronized with the CDM in real-time. The XML View may provide an efficient process communication with the server by sending incremental updates between bulk updates. For example, if a user changes element E in the XML element hierarchy of an XML View, the XML View class (or system) may determine which entity the element corresponds to. If the user has created a new relationship with the given entity, the XML View/system may send an incremental update in the form of a message, which may indicate the kind of relationship created and entities connected by the relationship. If the user updates the data of an entity (e.g., a field), the XML View/system may send an incremental update in the form of a message, indicating the entity to update, field name, and new field value. An embodiment of the XML View is explained more fully in U.S. Provisional Application No. 60/455,739 entitled "Network File System and Method", which is incorporated by reference herein, in its entirety, including the computer program listings of the appendix.

In embodiments, the relational "context bar" (or "information bar" or "side bar" or "information side bar") may deliver contextual information to the user in real-time. It is typically positioned as a window within or beside the window of the application. Contextual information is typically considered relational information for entities a user/application "consumes" at any given moment (e.g., for example, entities a user is browsing, editing, selecting, working with, and so on). As the user "consumes" an entity, a relationship may be established between the entity and user, allowing the platform to deliver relational information associated with the entity. For example, the user may receive a list of messages/comments associated with the section of a document, see who else is editing the section, or browse its semantic web of association. The context bar includes all tasks which apply to specific entities consumed by the user at any given moment. For example, the task "share document" allows the user to share the document the user is currently editing with other users.

Figure 27:
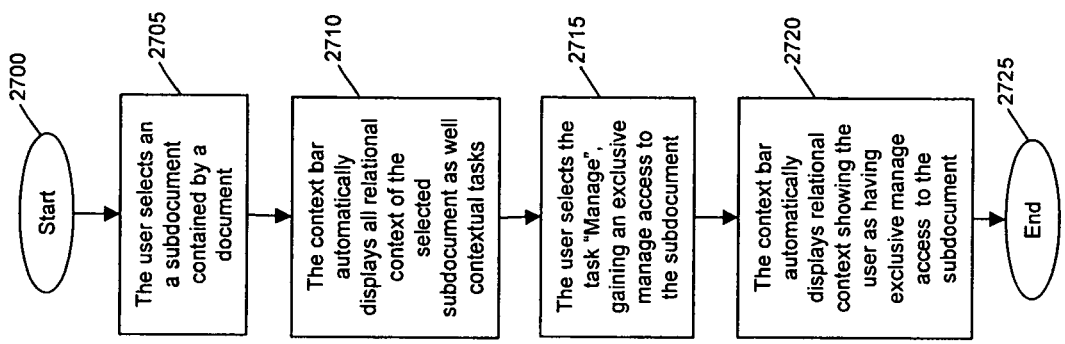
FIG. 27 is a flow chart of an embodiment illustratively showing steps of the application context bar.

By way of example, FIG. 27 is a flow chart of an embodiment illustratively showing steps of the application context bar, starting at step 2700. At step 2705, the user may browse or select an entity(s). The user may be considered as actively "consuming" the entity(s) while the entity is selected. At step 2710, the context bar may automatically display all relational context of the selected entity(s) as well contextual tasks applying to the entity(s) or other entities. At step 2715, the user may select the task "Manage" (or any other task), gaining exclusive manage access to the entity. At step 2720, the context bar may automatically displays relational context showing the user as having exclusive manage access to the entity(s). Such automatic, relational "discovery" (of contextual information or data related to entity(s) consumed by the user) and presentation is typically a component of the process of information. At step 2725, the process is complete.

The Dynamic View

The process of access evolution, in combination with the evolving data medium, may fulfill the level of complexity required to support complex work flow and dynamic interaction among knowledge workers. The process includes relational context, which may provide users an entirely personal view of the information space, depending upon the groups, activities, and other information contexts of which they are a member. That is, two users may receive an entirely different view of the same document entity. The system includes a "dynamic view" (typically of the CDM) which is typically custom integrated for a specific user (or any actor/consumer in the system).

Figure 9:
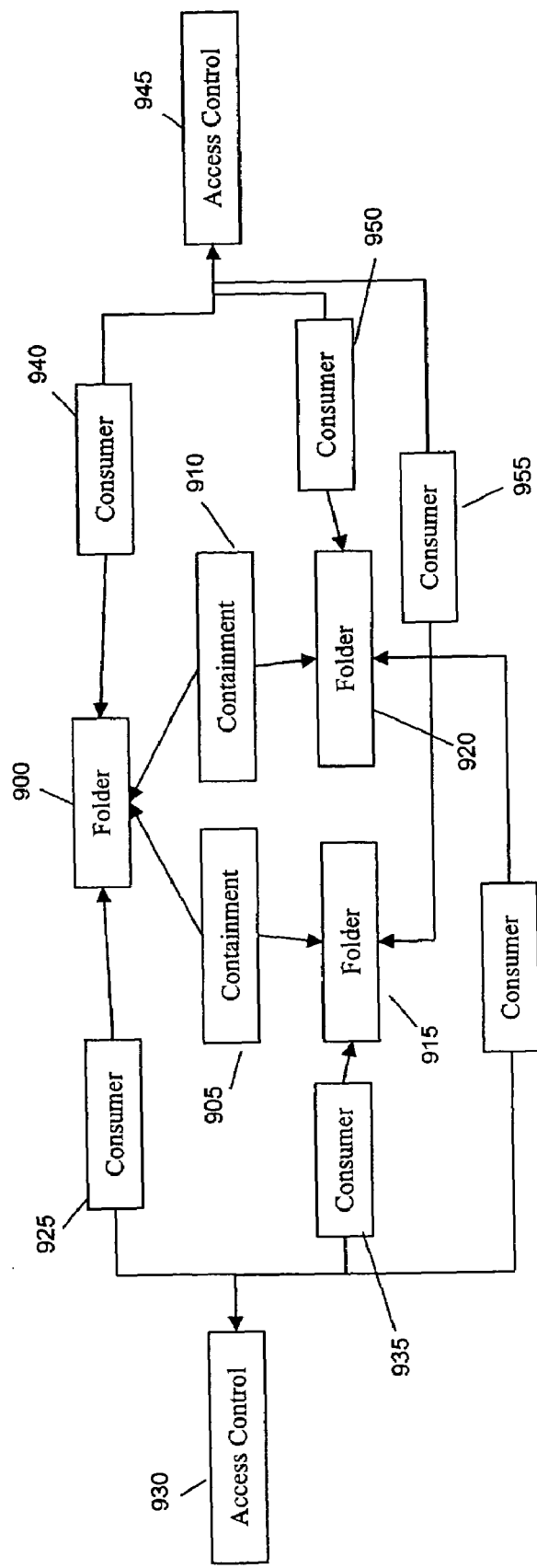
FIG. 9 is a functional block diagram showing an embodiment of compiling a unique view for a user.

By way of example, FIG. 9 is a functional block diagram showing an embodiment of compiling a unique view for the user. FIG. 9 illustrates a folder 900, containing folders 915 and 920 through containment relationships 905 and 910. Access control 930 may consume through relationships 925 and 935 the folders 900 and 915. Access control 945 may consume through relationships 940, 950, 955 the folders 900, 915, and 920. That is, access control 945 may grant access to folder 920 which is not granted by access control 930. The state may be the result of the following scenario. For example, User A, who may have access to folders 900 and 915 through access control 930, may create 940, creates derived access (perhaps by "attaching" folder 900 to an e-mail message) through access control 945 for user B. User A may also grant manage access to access control 945, user B. User B subsequently obtains an exclusive manage access (an exclusion on folder entity 900). User B then "inserts" folder 920 in folder 900 by way of the containment relationship 910. User A does not at that point gain access to the newly inserted folder 920, since user B holds an exclusion on folder 900. Therefore, when users A and B view the folder 900, the system may typically generate two separate views for each user. User A's view may show folder 900 as containing folder 915. User B's view may show folder 900 as containing folder 915 and folder 920. In this way, each user may receive a dynamic view based on their typically unique set of information contexts of which they are a member. When user B releases the exclusion, the system typically updates user A's view in real-time based on the access evolution, which creates a new "consumer" relationship 960 connecting access control 930 and folder 920. In this way, user B may work "ahead" of user A in time (e.g., from user A's frame of reference) and B may sit "behind" user A in time (e.g., from user A's perspective), illustrating temporal continuity in the CDM, process of access evolution, and work flow.

Real-time updating provides an example of how implicit information (or managed information) may be consumed by an application (in this case, the file explorer). When the relationship 960 is created, the system typically responds to the change (in the form of relationship 960) by looking at all entities affected by the change. These entities may include folder 900. The system typically then notifies the application consuming folder 900 (i.e., both instances of file explorer, run by users A and B) of the change, or relationship 960. The application may respond by automatically updating the view to include folder 920.

FIG. 9 also provides an example of contextual information. As user B holds exclusive manage access of the folder 900, user A may receive in the "context bar" information to the effect "user B is currently managing the selected folder" when folder 900 is selected.

Referring again to FIG. 4, the integration of a dynamic view at a specific point in time is demonstrated. To integrate the hierarchy at a specific time, the system typically filters the containment relationships along the time dimension, such that only those relationships (and by extension, the contained entities) existing at or before the specified time are (typically) included in the dynamic view. FIG. 4 may illustrate the process of generating a dynamic view at time 't'. If containment relationships 405 and 410 were created before time 't' and 415 after time 't', the system may include in the dynamic view of folder 400 documents 420 and 425 (via relationships 405 and 410) but would not typically include document 430 (via relationship 415).

Generally, the dynamic view may be considered a "2D" representation (typically flat, such as XML View) and mapping of "3D" relational data (typically the CDM). The dynamic view may be further considered by its typical process of real-time, bi-directional synchronization. The dynamic view may further be considered by its typical ability to reflect access evolution. The dynamic view may further be considered by its typical ability to link the information process (e.g., including contextual information) to the representation (e.g., allowing a user to navigate relationships attached to entities contained in the view). The dynamic view may further be considered by its typical ability to provide a standard "2D" view of relational data to an application.

Automation

The invention may provide "automation" as the autonomous actor in the system, typically comprising a computer program. The automation typically interacts with platform in the same way an application interacts with the platform (and typically interacts through the same interface used by an application), except that automation is typically self-governed and may be considered an actor in the system (compared with an application which typically acts on behalf of a user, where the user is typically an actor in the system).

The invention may automatically "raise" (or load) the automation to process an event. For example, the system may raise the component automatically to process new information relating to data consumed by the automation. The automation may be considered a "component" of the system. For example, a user may "automate" a semantic web, allowing the automation to respond to interaction users have with members of the semantic web.

The automation may receive several events, including "before change" and "after change". These events may belong to the general interface provided by the system as a component of the information process. The "before change" (or "pre change") event typically allows automation to respond to a change before it is made. The automation may be allowed to preempt the change by throwing an exception (which is typically captured by the platform). The "after change" (or "post change") event typically allows automation to respond to a change after it is made. The before and after change events may be a standard element of the platform API (e.g., applications may process the same events).

The platform may "manage" automation as data persisted within the CDM. When managing automation, the system typically automatically loads and terminates automation based on data the automation may be known to consume (e.g., through "consumer/access" relationships).

Figures 19, 20:
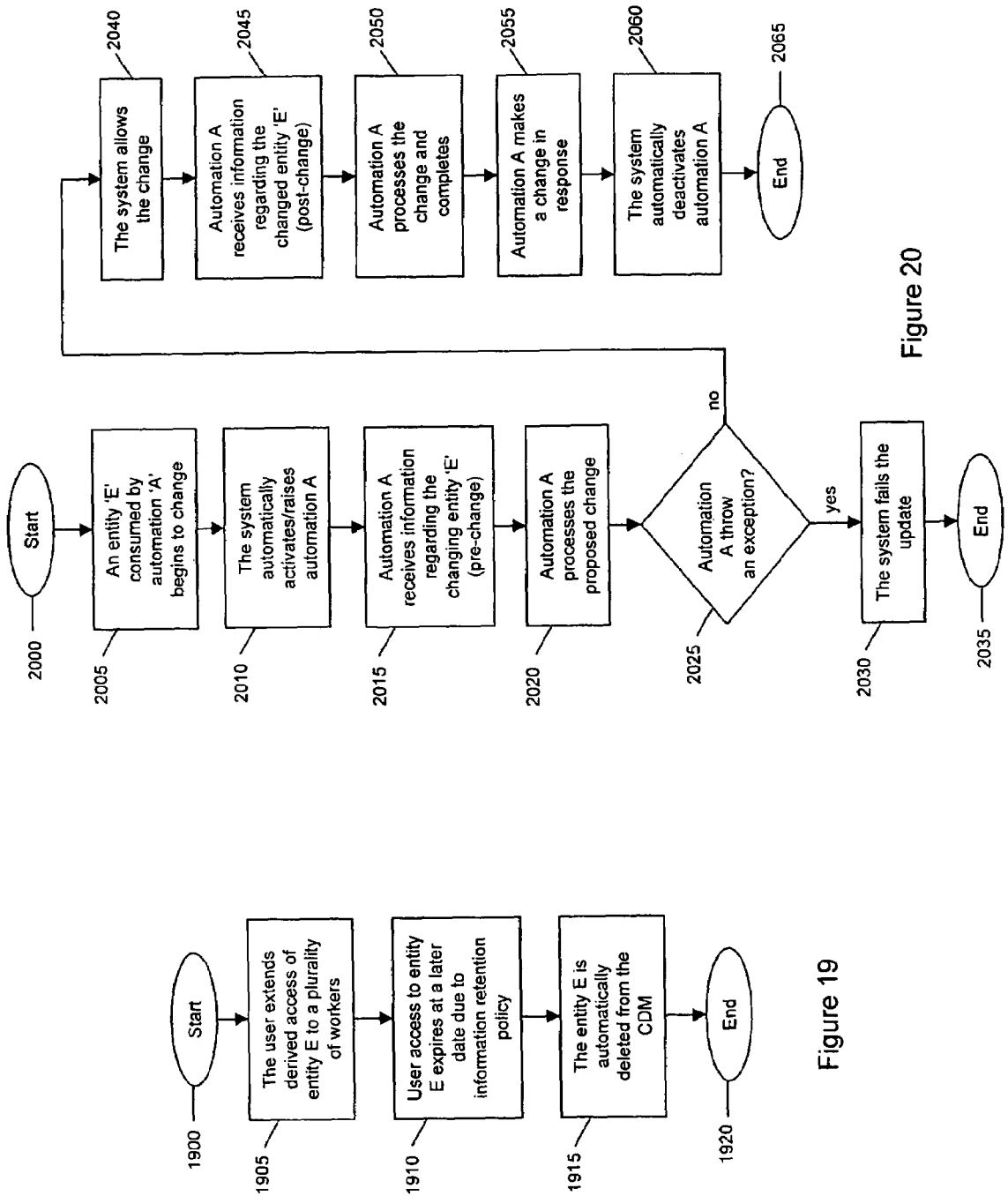
FIG. 19 is a flow chart of an embodiment showing steps of the information lifecycle.
FIG. 20 is a flow chart of an embodiment showing steps of in an instance of automation.

FIG. 20 is a flow chart of an embodiment showing steps of in an instance of automation, starting at 2000. At step 2005, an entity 'E' consumed by automation 'A' may begin to change. For example, a user may have issued the system to create a relationship for which E is a target or have issued the system to update data belonging to the entity. At step 2010, the system may automatically activate/raise automation A. At step 2015, automation A may receive information regarding a change in entity 'B' (e.g., pre-change). At step 2020, automation A processes the proposed change. For example, the automation may analyze the proposed structure to maintain a constraint. At step 2025, automation A may or may not throw an exception (which may be captured by the system). An exception may indicate that the automation suggests the system may fail the change. For example, the automation may automate a constraint, which it may seek to enforce by throwing an exception. If 'yes', then at step 2030, the system may fail the update. At step 2035, the process ends. If 'no', then at step 2040, the system may allow the change (the system may also fail the change for other reasons). At step 2045, automation A may receive information regarding the changed entity 'B' (post-change). At step 2050, automation A may process the change (for example, checking a data structure) and may then signal the system that processing is "complete". At step 2055, automation A may make a change in response. For example, the automation may insert a new relationship in response, or may create information for the user who attempted to make the change (e.g., providing notification). At step 2060, the system may automatically deactivate automation A. At step 2065, the process ends.

Reconciliation

Marketplace fragmentation is largely due to polarization. A natural tension exists along the real dimensions of knowledge work, including centralization/decentralization and synchronous/asynchronous, but which the current data paradigm is incapable of reconciling. Systems have swung to the polar extrema of each dimension in an effort to gain a uniform design. As a result, the market is fragmented among many systems, which neither individually nor collectively provide a workable solution. The invention reconciles the major axes of collaboration, which currently exist as a fragmented set of disparate technologies.

Information management largely lies in the reconciliation of centralization and decentralization. The invention enables information management by reconciling two forces of collaboration: the decentralized information process and the centralized information product.

Knowledge work includes a continuous cycle of information "product" and "process". The process of knowledge work is change, which may feed a collective information product. Product feeds process as knowledge workers allocate work based on their knowledge of their collective work product. Process may then feed product as workers execute work/change.

The process is necessarily decentralized, since knowledge work is at any moment an individual effort. But the product is necessary centralized, as a collective and integrated work effort. Thus, reconciliation of a decentralized information process and centralized information product is a necessary element of collaboration.

Figure 22B:
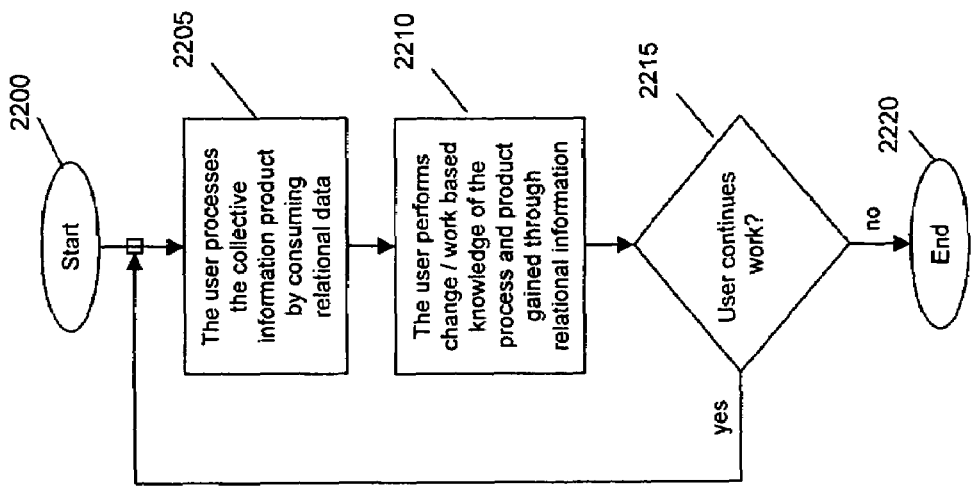
FIG. 22B is a flowchart of an embodiment illustratively showing steps in the collaborative cycle.
Figure 22A:
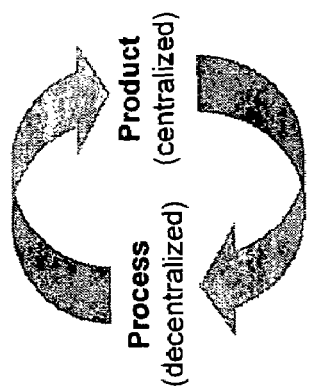
FIG. 22A is an illustration of a process of reconciling centralization and decentralization.

FIG. 22A is an illustration of a process of reconciling centralization and decentralization, according to the invention. The illustration shows a fundamental cycle of collaborative knowledge work, continuously reconciling the information process (typically through the evolving access model) and information product (typically through the evolving data model). The cycle is substantially the basis of productivity.

FIG. 22B is a flowchart of an embodiment illustratively showing steps in the collaborative cycle, starting at 2200. At step 2210, the user may process the collective information product by consuming relational data. At step 2215, the user may perform change/work based knowledge of the process and product gained through relational information. At step 2215, the user may continue knowledge work, returning to step 2205. Otherwise, at step 2220, the process ends. Every knowledge worker belonging to an information network may simultaneously and collectively participate in the collaborative cycle through the invention.

Figure 21:
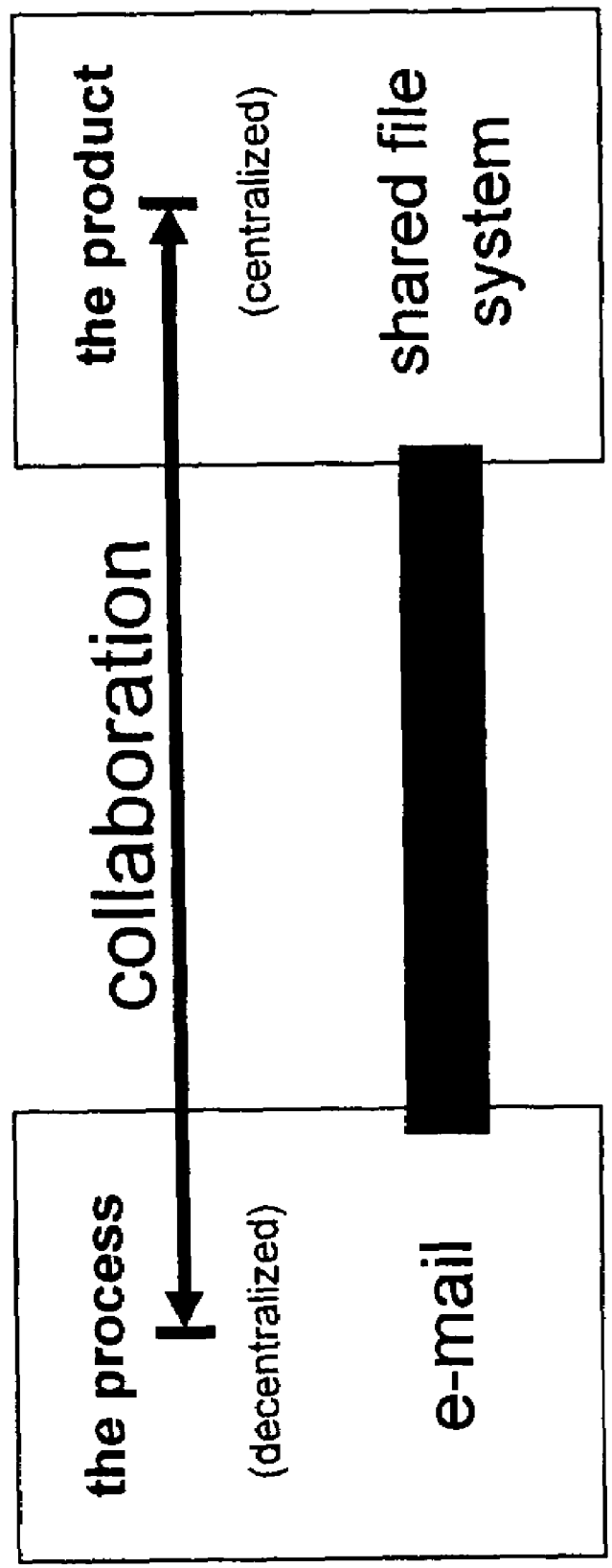
FIG. 21 is an illustration showing a centralized and decentralized dichotomy.

FIG. 21 is an illustration showing a centralized and decentralized dichotomy. Prior to the invention, systems are divided at opposite ends of the spectrum of logical centralization and decentralization. Systems currently occupy logical extrema on the spectrum of collaboration. E-mail is a model of absolute decentralization. The shared file system is a model of absolute centralization. They typically act in fundamental opposition of one another. On one end, e-mail provides context but eliminates structure. On the other end, the shared file system provides structure but eliminates context. As a result, the collaborative cycle has been grossly inefficient. A void exists between pure centralization and decentralization. The decentralized system (e.g., e-mail), typically oriented with a process, is shown on the left, the centralized system (e.g., shared file system), typically oriented to a product, is shown on the right with a void between these two systems as far as collaboration is concerned.

However, the CDM, according to the invention, is sufficiently complex to contain a process of contextual workflow ("information process") within a single, continuous, and integrated information product repository ("information product"). The invention includes the effect of maximizing worker productivity by continuously reconciling the collaborative process with a collective work product through implicit, relational information. The invention may push to the user (in real-time) the relational context of entities which are "consumed" by the user's data view at a given moment. As the user works with a given entity (e.g., browsing or editing), the environment may present the set of information which exists through relationships connecting the given entity. Those relationships may not only provide the entity's context, but may also control the context in which the user works with the entity.

The context controlled by relationships includes, for example, a user's view of a given entity, control of the entity, and action taken upon the entity. Such control may include the evolving access model, which may give two users different views of the same entity (e.g., document) based on their role in a process of serial work flow. For example, the environment may display the draft version of a document to one user (e.g., who may be working on the latest set of best practices), and a previous version of the document to another user (who needs to review the working set of best practices). Another example of contextual control is the "activity", which contains a set of work/change contained across a set of files. The access constraints of the activity prevent any user who is not a member of the activity from seeing or editing document sections/changes belonging to the activity. But, for those members of the activity, the environment may display work/change in real-time across the set of files, or allow the user to browse and review the set of change.

The context provided by relationships may illustrate the meaning and appropriate interpretation of a given entity. For example, the activity previously illustrated also comprises a "semantic web" of association linking work/change belonging to the activity. As a result, a user who browses the content of a document containing such a change (assuming required access) is notified (e.g. in a side view) that the change was created as part of the activity, and for its stated purpose of the activity, in association with all other changes belonging to the activity (which the user may browse and review). Also associated with the change, and pushed into the users' side view, may include discussions and messages exchanged by users in the course of making the change, which allow the user to understand the exact wording of the change. If the user decides to edit the section (containing the change), the environment may automatically block other users from editing other members of the semantic association (protecting consistency of the association). The mechanism of collaboration—reconciling centralization and decentralization—may be analogous to the industrial revolution's assembly line, which continuously reconciled the division of labor among workers and individual stations (a decentralized process) and the integrated, collective product of their work (a centralized product). The invention may be considered as transferring collaborative complexity (typically managed in the minds of knowledge workers) into data and data relationships (within the managed CDM). Mitigating complexity by this mechanism may typically allow the invention to manage and enable collaboration on a large scale (e.g., enterprise-wide or inter-enterprise collaboration and knowledge management).

Network File System

The invention provides a network file system (NETFS) as a method of collaboration for file-oriented (or traditionally unstructured and PC-centric) knowledge work. The file system is built within the CDM. The file may be implemented as an entity, its structure defined by a "form". Every entity managed by the user in the file system is of a form which derives the file. For example, the 'message' and 'folder' and 'activity' are typically files (deriving the file's form). The relational structure of the network file system is built using a variety of relationships, including the containment relationship, access/consumer relationship.

A mechanism of access control and sharing in NETFS includes e-mail, built directly within the network file system. Users may create derived access to a message and attached files in an e-mail interface, thereby "sending" the message. The e-mail infrastructure of NETFS may be integrated with existing client applications, such as Microsoft Outlook. Users may also access messages as files through the NETFS file explorer.

An embodiment of the explorer contains, at the root level, My Documents and My Inbox. My Documents contains files accessed/managed by the user, providing a folder in which the user can organize his/her data. My Inbox contains messages "sent" to the user through derived access. When derived access may be created, the new relational data connecting the user with the message automatically updates the user's Inbox view.

Reconciling E-mail & Shared File System

The invention embraces the e-mail paradigm as a powerful mechanism for creating collaborative context. The work flow model of the invention unifies e-mail and shared file management within a single, continuous information space. The invention may provide e-mail as an element of the network file system, reconstituting the infrastructure of e-mail within the CDM/platform. Messaging becomes an integrating factor (prior to the invention it is a "dis-integrating" factor), as users draw one another into shared information spaces, which belong to the continuous CDM. The access control model is able to allow a user to exchange e-mail in a way that is consistent with the current e-mail paradigm, while synchronizing and streamlining the subsequent process in real-time.

In the same way groups organize work in a single document by multiple activities, groups may organize internal discussions within a common message. Therefore, while two users may have different views of the same discussion, the discussion remains an integrated body of messages. Users may invite others into a discussion by forwarding them the message containing the discussion. The e-mail "forward" in NETFS includes other messages or files, involving users in a shared space by invite.

Figure 24:
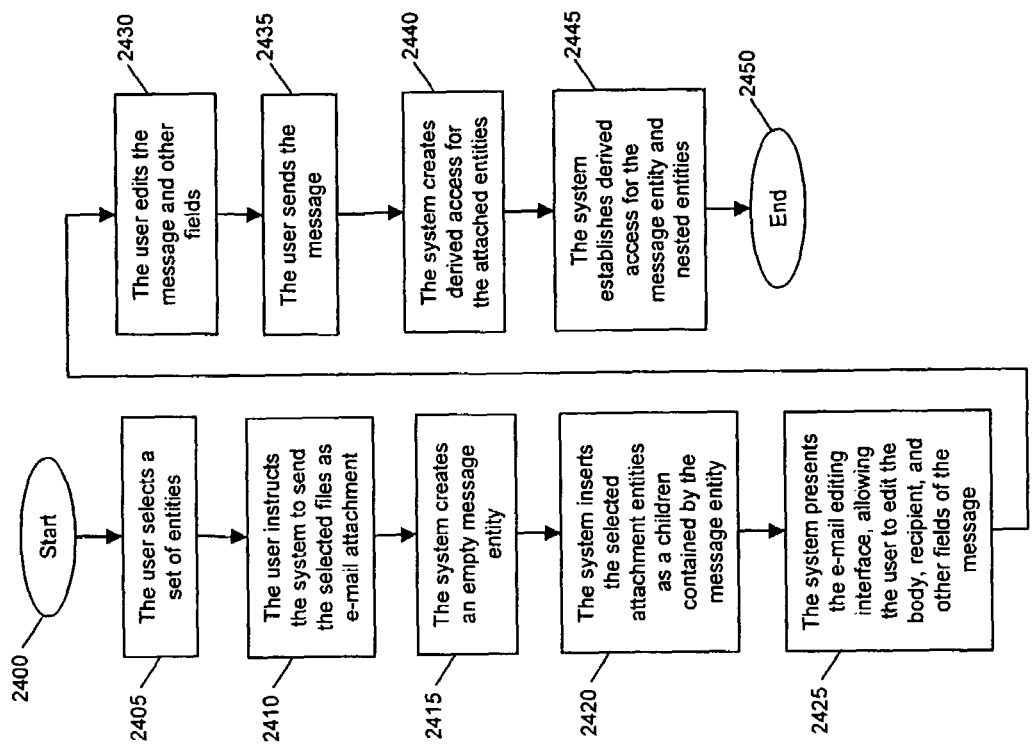
FIG. 24 is a flowchart of an embodiment showing steps of creating derived access through e-mail.

By way of example, FIG. 24 is a flowchart of an embodiment showing steps of creating derived access through e-mail, starting at 2400. At step 2405, the user may select a set of entities to send via e-mail attachment. At step 2410, the user may instruct the system to send the selected files as e-mail attachment. At step 2415, the system may create an empty message entity. The user may alternatively send the message with no attachment. At step 2420, if the user made attachments, the system may insert the selected attachment entities as a children contained by the message entity. At step 2425, the system may present the e-mail editing interface, allowing the user to edit the body, recipient, and other fields of the message. At step 2430, the user may edit the message and other fields. At step 2435, the user may instruct the system to send the message. At step 2440, the system may create derived access for the message and other contained or attached entities (e.g., the set E). In creating derived access, the system may typically include in the access group the containment hierarchy of every entity belonging to the set E. For example, attaching a folder system F to message M may typically include all files contained by F (e.g., the folder hierarchy) in the access group. At step 2445, the system may automatically establish derived access for the message entity and nested entities for recipients of the message. The system may establish derived access for recipients individually. The system may establish derived access for recipients as a group. At step 2450, the process ends.

The invention may include a hierarchical structure containing "organizational units" (OU's). The organizational unit typically contains other organizational units and users (in some implementations, the user may be considered an OU). The "group" is typically implemented as an organizational unit. Access control may designate the organizational unit as a recipient of shared access. For example, a group may receive shared access to an entity. Any member of the group may then receive access to the entity. The scope of an organizational unit in terms of security policy typically includes its membership (typically any user or organizational unit it contains carries access the OU derives).

Figure 23:
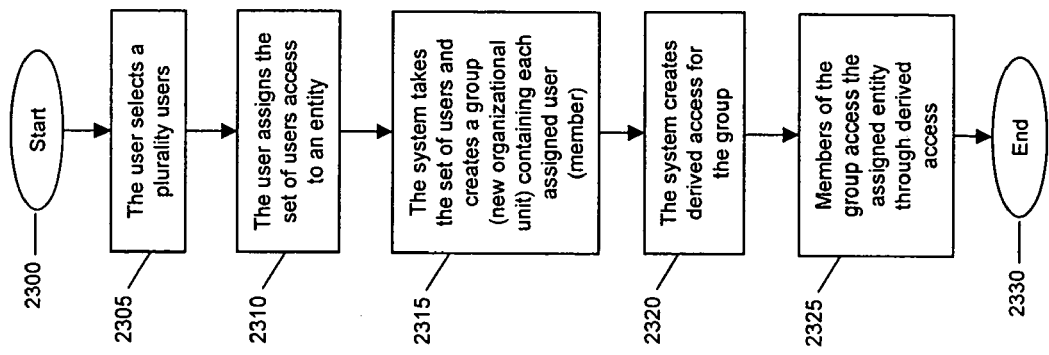
FIG. 23 is a flowchart of an embodiment showing steps of creating derived access for a group of recipients.

By way of example, FIG. 23 is a flowchart of an embodiment showing steps of creating derived access for a group of recipients, starting at 2300. At step 2305, the user may select a plurality of users. At step 2310, the user may assign the set of users access to one or multiple entities. At step 2315, the system may automatically take the set of users and create a group (a new organizational unit) containing each assigned user (group member). At step 2320, the system may automatically create derived access for the group. At step 2325, members of the group may automatically receive access to the entity(s) as a group. At step 2330, the process ends. Prior to the invention, setting up groups for purposes of collaboration typically involved a central, administrative procedure (creating a static group). The invention may thus allow knowledge workers to self-organize in groups dynamically and easily perform group work (while preserving and remaining within a continuous and integrated data medium), as FIG. 23 may illustrate.

Figure 25:
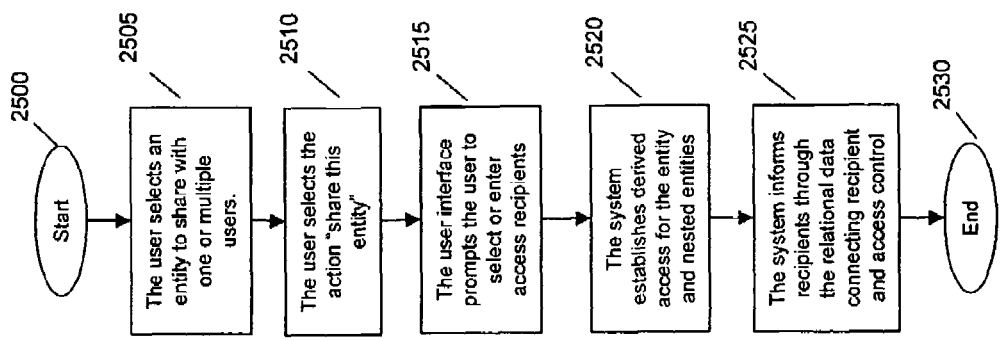
FIG. 25 is a flowchart of an embodiment showing steps of creating derived access to a complex data structure.

FIG. 25 is a flowchart of an embodiment showing steps of creating derived access to a complex data structure, starting at 2500. Creating derived access to an entity's contained complex data structure typically assigns the containment hierarchy of which the entity is root as the access group. In other words, the entity and its descendents (contained or nested entities) may typically comprise the access group. At step 2505, the user may select an entity to share with one or multiple users. At step 2510, the user may select the action "share this entity". For example, the user may select a folder which contains an entire folder system (that folder system comprising a complex data structure). At step 2515, the user may be prompted to select the set of users to receive shared access (recipients), or the set recipients may be implied contextually. At step 2520, the system may typically establish derived access where the entity and nested/contained entities comprise the access group. At step 2525, the system would then typically inform recipients of derived access (in this case, new e-mail) by the method of relational information. At step 2530, the process ends.

Reconciling Synchronous & Asynchronous Collaboration

The invention includes a mechanism of reconciling synchronous and asynchronous collaboration within the CDM. The mechanism is based on the transformation from explicit to implicit information. The invention establishes a powerful mechanism of asynchronous information collaboration based on the relational structure of the CDM. The invention may enable asynchronous information by pushing relational information that is "in context" to the user in real-time (typically entities consumed by the user at a given moment are "in context"). The method of asynchronous collaboration may then subsume synchronous collaboration, allowing reconciliation of synchronous and asynchronous collaboration.

The system provides "structured messaging" as a mechanism of unifying synchronous and asynchronous messaging. The mechanism may unify e-mail, instant messaging, and threaded discussions as a single, relational structure. The common container used is the "message" entity, which may be, for example, an ordinary file.

The message may extend the file as a unified method of communication among workers. It may be a recursive structure enabling the message to become a threaded discussion among multiple workers, either synchronously (e.g., as an instant message discussion) or asynchronously (e.g., as an e-mail message). The user may insert an attachment (e.g., any file) within the body of the message. The application may display the attachment in-line and/or as belonging to a set of attachments.

The mechanism of "structured messaging" may thus be hierarchical. The mechanism is described in further detail for various elements of messaging, including email, instant messaging, and discussion threading, for example.

The existing e-mail paradigm fits and is well behaved within the unified structure. The invention improves the e-mail paradigm by adding structure to a medium which is presently flat. Whereas the inbox is typically a list of messages (i.e., prior to the invention), the invention now includes the ability to create structure in a message store (such as My Inbox). The structure may be applied as, for example, A "reply" (message A) to message B inserts message A as the child of message B, as though B were a folder containing a document. A "forward" (message C) of message A inserts message A as a child of message C. A file (F) "attached" to a message (D) inserts file F as a child of message D. The CDM allows and provides for a user to attach an entire folder system (since the root folder is file). The body of a message may also include "in-line" comments, or messages which are related to sections of the body of the message. This allows a user to respond to sections of a message individually.

The existing instant message (IM) paradigm also fits and is well behaved within the unified structure. The invention improves the paradigm by allowing IM to become a part of a persisted structured (prior to the invention, IM lacks the relational context in which to persist a transient message). As a result, the invention may allow a discussion to occur and continue synchronously and/or asynchronously. The invention may also allow a member of a discussion to spawn subdiscussions. A subdiscussion (B) of message A may be comprised of messages S1 to Sn (where n is some positive number greater than one). Each message Sx (where x is a positive integer number) may be inserted as a child of message A. In this way, message A may become a discussion "thread". The user view of a same-time instant messaging discussion may include a header (showing the containing message, or discussion thread) and a list of discussion points (content of messages contained by the discussion thread).

The invention provides for establishing messaging as the "comment" mechanism in the document review process. This allows a user to insert a comment by selecting a range of document content and clicking "insert comment". A window or sidebar (entry point) appears, in which the user may enter his or her comment. The comment is a message (in one implementation, the document contains a range object, which is contained by the message). The environment may immediately integrate the comment into the document views of users who are also working on that document (and who have access to the message). The message may then become a group discussion as users create submessages within the comment (by e-mail reply or instant message). The same mechanism may enable a user to select-and-reply to sections of an e-mail (e.g., in a manner similar to embedding comments between carated sections of a traditional e-mail message).

A structured message hierarchy may include messages created in same-time and asynchronous format. Users may create an e-mail message in the e-mail editor for asynchronous communication, while other users may create a same-time discussion where the e-mail message may become a discussion thread (each IM message becomes a child of the e-mail message, in the same way an e-mail reply is inserted as a child of the message). In this way, users are able to select the appropriate medium (synchronous or asynchronous) and an associated user interface (e.g., e-mail editor, IM discussion viewer, or other interface), while creating an unified message space.

Therefore, whether the user selects, for example, an e-mail interface or IM interface to create a message, the environment delivers the message in real-time (by relational association with documents or other entities which other users consume). As a result, each user consuming an entity associated with the message may respond synchronously. Or, a user may respond asynchronously (e.g., as he/she browses the document at a later date), the message automatically appearing in the relational context/side bar (assuming read access). By relating messages to other entities, communication among workers becomes implicit.

FIG. 18A is a flow chart of an embodiment showing steps of the process of unified synchronous/asynchronous messaging, starting at step 1800. At step 1805, user A may send user B an e-mail message M by access derivation. At step 1810, user B may receive the message. At step 1815, B may reply to the message, where the reply is typically inserted as nested element of the message M. At step 1820, user A typically receives the reply as relational information. At step 1825, the system informs recipients through the relational data connecting recipient and access control. At step 1830, the process ends.

FIG. 18B is a flow chart of an embodiment showing steps of the process of unified synchronous/asynchronous messaging, starting at step 1840. At step 1845, user A may create a comment as message M associated with document D. At step 1850, user B may automatically receive message M as relational information in the context bar while browsing document D. At step 1855, B may reply to the comment, where the reply R is typically inserted as nested element of the message M. At step 1860, user A may load the document D at a later date. At step 1865, user A typically receives reply R as relational information in the context bar while browsing document D. At step 1870, the process ends.

Reconciling Top-Down & Bottom-Up Collaboration

The 'knowledge gap' created by direct and explicit information may include the following organizational effect. The organization manages the exponential difficulty of managing a process through direct coordination (due to the exponential growth of explicit information in a network) by instituting top-down hierarchy. As a group expands, it becomes increasingly subdivided and hierarchical, in an effort to gain manageability. Managers assume positions in the hierarchy. Hierarchy is required in the context of explicit information, but has the effect of making the organization static and unresponsive to change.

A principle of knowledge work established by the invention is that knowledge work is fundamentally dynamic. Neither the product nor process of information work can be known before the work is performed. Otherwise, the information product would already exist. Unlike a manufactured good, there typically is only value in creating information once. There is value in creating the same automobile many times; there is typically no value in creating the same information twice. This is the fundamental difference between the new, knowledge economy and the old, manufacturing economy. Knowledge work is fundamentally dynamic, manufacturing work is fundamentally static.

The principle of knowledge work explains why hierarchy fails in the knowledge economy. It also explains why attempts to apply static workflow automation in knowledge environments, such as Microsoft's SQL Workflow or Lotus Notes™ appear to be insufficient, and why "a priori" process management software, such as Microsoft Project® appear to be in limited use. The principle also explains why central, statically ordered file sharing systems have failed to capture market share, while personal file systems and flexible e-mail transfer have become ubiquitous as knowledge work. These systems have failed because they are static and linear. Knowledge work is dynamic and non-linear.

In contrast, the invention establishes a mechanism of knowledge work from the "bottom-up", and as a "network dynamic". Individuals, groups, activities may self-organize based on the relational information which fuels implicit collaboration. Workers do not need to coordinate their work explicitly, or even know they are working with one another. To work in the space is to collaborate. Processes of individuals, groups, and groups of groups become aligned, and efficient, as a product of individual work within the shared environment.

The invention may also reconcile bottom-up and top-down collaboration by allowing users to assign work to others (top-down) or to self-assign work (bottom-up) based on relational information. The environment may allow an organization to roll up activities (creating from the bottom-up) into a top-down hierarchy to assess productivity, an evolving product, or evolving process. Executives may receive a continuously integrated view of the process and product of knowledge work.

The environment provided by the invention establishes a framework for maximizing bottom-up collaborative productivity and top-down decision support/business intelligence. Data systems manage state. The information system of the invention establishes managed change. Prior to the invention, change is unmanaged. An example is Microsoft Word's document format, which captures change only until it is absorbed by document state (e.g., when a user accepts a change). Prior to the invention, systems may have the ability to capture change, but users manage change. Those users manage the reconciliation of data change, they manage the transfer of changed data via e-mail, they communicate and direct the process of change by e-mail and other explicit means, and they manage the subsequent meaning of change.

The invention enables the fundamental reconciliation of state and change within the CDM, as the confluence of managed process/change and managed product/state. Several constructs built upon the mechanism of relational change further illustrate the reconciliation.

The invention provides for establishing the "activity" as a natural container of work (change). The activity may be implemented as a file, for example. The activity's membership may be determined by derived access, an access control granting view and/or manage access to members of the activity. A group is typically created to contain the membership of the activity. This group is typically the recipient of derived access. The activity may include a summary, or statement of purpose, a set of threaded discussions, a set of shared tasks, a set of working documents, and a structure called a "semantic web" which captures work performed by activity members. The structure of the activity may be recursive, containing sub-activities. In combination with the shared task set, the activity may provide a data structure corresponding to the task hierarchy of project management software (such as, for example, Microsoft Project), enabling fluid integration of project tasks and shared data.

The invention provides for establishing the "semantic web" (or semantic association) as a mechanism of managing and maintaining the correctness, completeness, and consistency of data ("3C"). Semantic association may capture the linkage which exists in the embedded meaning of data. The semantic web includes the ability to capture that meaning. The web may relationally link data within a structure, such that members of the structure are considered elements of a whole. The web may exist on multiple levels, as in a hierarchy. Automation may allow a semantic web to respond dynamically and in real-time to the "consumption" (view, change) of member data. Automation may allow the web to maintain 3C. Action taken by a web may be governed by its access to member data. For example, the web may preempt change being made by a consumer, or provide information to a consumer.

An activity may capture work as a semantic association. Each change to a file belonging to the working file set contained by activity may become part of the association (if the change to the file is made under the activity). If several activities contain the same file, the user may choose the activity under which the work is performed. The activity and its semantic web may allow groups to work in the same document or set of documents under different activities. Access to work performed within one activity may then be restricted to members of the activity. If a user belongs to several activities which produced change in the same document, the user's view of that document may then automatically contain both changes.

The activity enables data atomicity and consistency by releasing (to evolution) the set of change only when the activity has been "completed". The semantic web controls the subsequent correctness and consistency (3C) of the change set. For example, if a user browses a section containing a change which belongs to the web, the relational information sidebar will display the association, explaining the context in which the change was made. The information provided may include the activity, allowing the user to understand the purpose and meaning of the change. For example, consider a set of documents containing a set of changes made to satisfy a certain provision of an employment agreement (perhaps as part of an activity delegated and carried out by several attorneys). Eliminating or changing any element can destroy the force or meaning of a provision. The semantic web may allow each attorney reviewing the document to understand its meaning. Each attorney typically receives contextual information in the context bar showing the relations that exist among changes/sections across a set of documents. In this way, the semantic web may allow a group of collaborators to protect the meaning, consistency, and correctness of data content.

The semantic web may also have automatic trigger logic, tied to a specific data element. Therefore, if the element changes, the web executes the automation. For example, the semantic web may target a section of California law, which, if changed by the California legislature, may impact the correctness and/or force of a document. Event-driven logic is triggered when the section of law is updated, notifying the appropriate attorney, such as, for example, the attorney who drafted the document. As a result, the automation sends a message to the appropriate attorney.

The semantic web may implicitly link the work of users and enforce constraints. For example, if two users working in separate documents begin to edit different members of the same semantic association, its automation may send each user information in real-time, enabling same-time collaboration (and allowing them to discuss consistency). Or, if a user begins to update any document content contained by a semantic association (as an example), relationship logic may automatically extend the exclusion (making the section read-only to other users) to other members of the association for the duration of editing.

The semantic web may be used to link other related data, such as the section of a document describing a graph and the graph itself. If the graph changes, the text explaining the graph may be incorrect, or visa versa. If the graph automatically updates, as a result of linking within the graph, the association may automatically notify the appropriate user.

In these ways, the invention enables an organization to manage change. Once a knowledge worker understands the meaning of an information product, he/she is prepared to deploy its value. In a shared environment, the effect of self-describing, relational information includes the creation of compound value. The environment of the invention drives traffic (e.g., changes) to the entities via relationships. Therefore, the relational density surrounding an entity may quickly recognize its value to the organization or, alternatively, eliminates the entity from view if of deminimus value. In this way, information value may be continually reinvested and redistributed throughout the organization, enabling knowledge management.

FIG. 17A is a functional block diagram of an embodiment showing mixed serial/parallel work flow. In the example, the invention enables users to collaborate in any combination of serial and parallel work flow. In this example, a user U assigns two groups G1 and G2 a set of files contained by activity through access derivation from access control 1705. While both groups are working in the same activity file set, their work is separated by context, or as two information spaces. The first information space may be associated with access control 1710, corresponding to activity 1. The second information space may be associated with access control 1715, corresponding to activity 2. Work (change) done as part of activity 1 or 2 can then be accessed only by members of each activity, since access exclusion exists for each access control (1710 and 1715) assigned to groups G1 and G2. In this example, then, the activities provide multiple context in which group work is performed. Each activity may include a set of changes made by members, allowing members to navigate and consider the set of changes as a whole (the sum group work effort). And each information space automates parallel workflow among members of an activity.

Referring again to FIG. 4, the "dynamic view" provided to each user browsing or editing (consuming) the set of documents is constructed based on her activity membership (more specifically, the access control controls her granting access to the activity and member content). If the user belongs to only one of the activities, a document belonging to the file typically includes only change belonging to that activity. That is, the dynamic view may integrate all change belonging to activities of which the user is a member. For example, if the user belongs to both activities 410 and 415, the dynamic typically integrates the sum change of each activity.

As additional contextual information, the relational context bar may automatically display which sections of a document are controlled by which activities. If an activity (via access control) holds a manage exclusion on a part of the document (e.g., a subdocument), and the user is not a member of the activity, the application may display the content as read-only, allowing the user to understand which sections are controlled by other activities.

In the same example, when a group "completes" an activity, the system may typically lift the manage exclusion of the associated access control. For example, when group 1 completes activity 1 (associated with access control 401), and the access exclusion of 401 is reset, the system may immediately evolve access in the views of members of activity 2 (that is, members of access control 415, who were not members of access control 410, but who share access to the evolving content through access control 405). In this example, the activity may allow a group to perform a set of change/work as an atomic and isolated whole, maintaining the integrity and consistency of the unit of work, while hiding/protecting the change/work from non-members of the activity until the activity is "completed".

FIG. 17B is a flow chart of an embodiment showing mixed serial/parallel work flow, starting at step 1730. At step 1735, user A may task an activity by derived access to group G with manage/control access. At step 1740, members of group G may obtain exclusive manage access of entities belonging to the access group and change the entities accordingly. At step 1745, each activity member (members of group G) may receive the total set of change made under the activity. At step 1750, the activity may be "completed", typically serially releasing the set of change belonging to the activity. At step 1755, other non-members may gain automatic access to the total set of activity change through access evolution. They may typically receive that information set in real-time and within their application view. At step 1760, all users who have access to activity change typically receive contextual information showing change created within the activity. At step 1765, the process ends.

The system may also provide "data reuse" through the temporal data medium. The system may implement data reuse in NETFS as a form of temporal containment. For example, a user may specify that a legal document contain another document at some time in the past. As a result, the system typically provides a view of the legal document embedding the "old" version of the contained document, even as other users may update the contained document.

The system may typically also provide multiple containment of an entity by multiple entities. The system may include multiple containment as a feature of NETFS. For example, several folders may contain the same document. The feature may allow, as an example, a user to cross-index files in folder hierarchies.

Multiple containment may allow several entities to contain a common part. For example, two documents may contain a common subdocument. As the subdocument is changed, both documents are, in effect, updated with the latest subdocument version. As users discover valuable content, they may reuse or share the content in new documents. Each instance of reuse may create a new relationship connecting the desired content, which increases the probability that the content is in the future found and leveraged by other users. "Relational search" allows a user to search for content based on a mechanism which may value content by its "relational density" or relational connectivity.

The system typically provides "association" as a feature of NETFS, allowing users to associate one entity with another. An "association" relationship may capture the association.

The system may typically provide a file explorer application as part of NETFS, which may allow users to browse and manage all files within a single application (e.g., documents, folders, messages, activities). The file explorer may provide a hierarchical view of files (illustrating the file containment structure). The file explorer may respond to the user's selection of a file by displaying a read-only view of the file in a pane or other window.

The system may also allow users to access files remotely. An example includes accessing, searching, browsing, and managing files (and their relational structure) through a web browser. The system may provide a clean mapping of managed data to HTML, given its relational structure. The system may provide a method of managing web content. The system may act as a world-wide-web server. For example, the system may provide a web server through HTTP. The system may provide HTML or XML as a representation of system managed data. The system may allow users to consider system-managed data the "working" data medium and HTML or XML a representation or view.

The system may capture change in a word processing document in the following way. Each change to the document may become an entity. Inserting a change may correspond to adding a containment relationship that inserts an entity (bearing data of the change) as a child of a document, subdocument, or other contained element of the document. Removing a change may correspond to negating the containment relationship. The sequence of entities contained the entity may be recorded by the containment relationship (which may store the child's position in the sequence contained by the parent entity). In this way, the document may comprise a large set of evolving entities, including subdocuments, changes, and other contained elements of the document. The document's evolution may be viewed as a process of granularization/unification. The user may unify change as whole sections of a document (may be considered the process of contraction/unification), and may granularize the document by change (may be considered the process of expansion/granularity). The word processing environment typically receives and updates change in real-time. For example, user A's view of a document may receive change being made to the document by other users, and visa versa. The following example illustratively shows this process.

Figure 26:
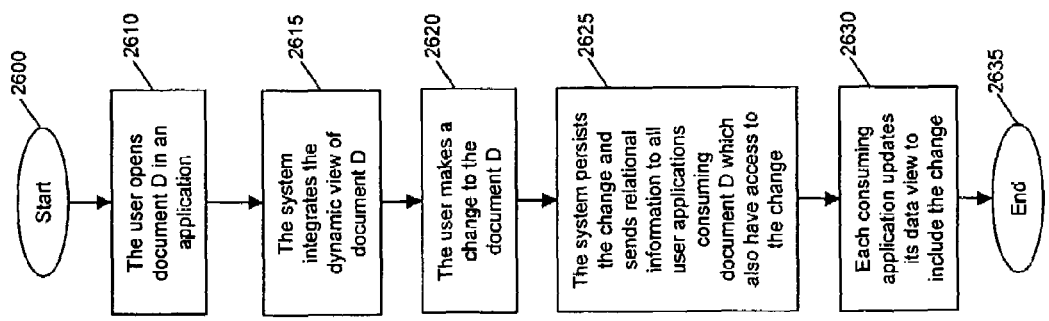
FIG. 26 is a flow chart of an embodiment showing steps in the process of parallel work flow among users working in a shared document.

FIG. 26 is a flow chart of an embodiment showing steps in the process of parallel work flow among users working in a shared document, starting at step 2600. At step 2610, the user may open document D in an application. In step 2615, the system may integrate the dynamic view of document D. In step 2620, the user may make a change to the document D. In step 2625, the system may persist the change and may send relational information to all user applications consuming document D which also have access to the change. In step 2630, each consuming application may automatically update its data view to include the change. In step 2635, the process ends.

Prior to the invention, files are typically managed in a "compound document format". XML may also be viewed as a compound document format. Whereas the compound document format compels data into a strict tree/hierarchy, the invention may levy no such requirement. Whereas the compound document format compels one entity to subsume another, the invention may make no such requirement. For example, the CDM may allow a document and comment to exist as separate and autonomous entities joined by "association" or an other means of relation.

In a broader class, "hierarchy" imposed prior to this invention carries into many realms of computer data and systems management. The invention may free computer systems from this limitation. For example, the security model prior to the invention typically requires that spaces fit within a tree. The result of the security model prior to the invention makes a lateral relationship impossible (or if a solution exists, it exists typically as a work around). For example, two companies would have extreme difficulty prior to the invention creating a shared data system (between servers regularly used to manage data in each organization, e.g., not a special purpose entity) during the course of an alliance, since neither security space may subsume the other. This holds for B2B and extranet relationships of many verities.

The invention may solve the problem at a fundamental level by establishing what may be in part a lateral network dynamic. For example, two firms may easily and quickly establish a working collaborative relationship using the invention, since the data/information/security space may be considered continuous across each organization (when paired as a network). For example, a user in firm A may send an e-mail message to a user in partner/client B. The system typically creates a unique information context for that specific collaboration (with entity E), imposing no static hierarchy (at the level of the firm) in the security relationship between A and B, while allowing A to control B's access to entity E. In this sense, the context generated by an individual e-mail (or any greater collaborative construct) may be considered a dynamic virtual private network (VPN), which may enable powerful, lateral collaborative relations between entities (e.g., including enterprises and universities, or autonomous governmental agencies in the context of intelligence sharing).

Unifying Security Context

The invention's access model may also enable an organization to create guaranteed file retention policies, simultaneously applied to documents and e-mail. As a result of e-mail, prior to the invention, file replication across hard drives is uncertain and unmanageable. Prior to the invention, the content of an e-mail message is duplicated every time the message is downloaded, copied into other folders, forwarded to other users, or included as part of a reply. The same is true for attachments, prior to the invention. NETFS may provide a managed system of file/e-mail lifecycle management. Features of the invention enabling lifecycle management include: (a) each message/file as a global entity, (b) the continuous data structure, preventing entity duplication.

Prior to the invention, about 90-95% of collaboration takes place via email, allowing information to spin out of control. Prior to the invention, email transfer is not secure or regulated, files may typically be copied everywhere as attachments, and there is no concept of centralized storage and organization. The invention, however, includes the ability to enforce information boundaries and regulate how information is exchanged. Whereas systems prior to the invention only manage how information is accessed, the invention permits an organization to manage how the information is exchanged (and its access subsequently revoked) within a fully controlled environment. Under the invention's security paradigm, workers still use email (which they are comfortable with) as the primary mechanism of exchanging information. However, according to the invention, email and attachments may now be managed and may remain within a single and secure information context. In this way, the invention establishes a "secure information environment", as shown above.

The access model of the invention may enable an organization to control information exchange via the invention's security model and rules/policies/best-practices. The invention may allow an organization to define "information boundaries". Information boundaries may exist within a signal organization or span multiple organizations. The information boundary may provide a container in which information exchange is limited. For example, a container may exist surrounding members of an organizational unit, or enclose a client and/or matter in the context of legal work (e.g., including certain members of a law firm, a client enterprise, and an investment bank). As a part of the invention's filed system, e-mail may be subject to additional security provided by an enterprise security implementation, such as, for example, Microsoft's ActiveDirectory. Since e-mail and filed may remain in the single information space, users are not able to bypass security by moving data between systems. For example, a user may not be able to e-mail a file to a user who would not otherwise have file access. Prior to the invention, even if access to a file is restricted by the security model to a select group of users, a member can simply e-mail the file to unauthorized users. The invention may allow an organization to contain data within a single, secure space, while preserving the end-user experience (e.g., the user typically cannot unintentionally or maliciously move data out of the security context or boundaries).

The invention may provide a dynamic "virtual private network" for any context in which users collaborate across distributed sites (of the platform). Those sites may belong to one or multiple organizations. Since each context may be managed individually, the method does not require that one organization "contain" the other from a top-down perspective. The trusted information model of the invention may provide secure, peer-to-peer exchange, connecting peers over the intranet, extranet, or Internet. Today, security requires public-key cryptography to be managed individually by e-mail sender and recipient. The invention may enable secure, public-key exchange between sites, freeing individual users from the security implications of data transfer. In this way, the invention may provide a superior implementation of DRM (Digital Rights Management).

FIG. 19 is a flow chart of an embodiment showing steps of the information lifecycle, starting at step 1900. At step 1905, the user may extend derived access of entity E to a plurality of workers, beginning an information lifecycle. At step 1910, the users who received access may lose their access due to security policy. For example, a security policy may allow only two weeks of access to the shared entity. Or, for example, a security policy may allow the users to retain access to the shared entity only while a business relationship exists between the firm of the user(s) extending access and user(s) receiving access (which may have ended). At step 1910, all users may lose access to the entity due to a file retention policy. For example, a file retention policy may automatically revoke access to data at a trigger point, such as three months after creation. At step 1920, the entity E may be automatically deleted from the CDM (e.g., as part of a file retention policy). At step 1925, the process ends. The entity may be cleanly removed from the system because the CDM typically prevents duplication of an entity (prior to the invention, files and messages scattered throughout user inboxes and hard drives make the enforcement of file retention policy nearly impossible). The invention may be considered as having a rope attached to an entity at all times, which it may retract at any moment (for security, information lifecycle, or other purposes).

While the invention has been described in terms of embodiments, those skilled in the art will recognize that the invention can be practiced with modifications and in the spirit and scope of the appended claims.

What is claimed is:

1. A computer implemented method of access evolution for automating the sharing of access rights in a computer environment having one or more access sharing relationships, comprising the steps of:
   a) creating an access sharing relationship in which an access provider having a first set of access rights shares at least a subset of the first set of access rights with an access receiver having a second set of access rights, so that the second set of access rights evolves as an automated function of the first set of access rights by way of the shared subset, wherein the access sharing relationship is one of one or more access sharing relationships in a network of access control;
   b) defining the subset based on constraints of the access sharing relationship; and
   c) sharing the subset with the access receiver,
   whereby the steps of defining and sharing comprise an iteration of access evolution,
   wherein the access provider has access rights to a newer version of an entity or file and the access receiver has access rights to an older version of the entity or file and deferring the sharing of the access rights to the newer version with the access receiver for a period of time, so that the access receiver has access to the older version prior to releasing a manage exclusion, and upon releasing a manage exclusion, the access receiver receiving access to the newer version, and
   wherein the steps of creating, defining, and sharing are performed by a computer.

2. The computer implemented method of claim 1, wherein the sharing is implemented by derived access control, such that the access receiver derives access from the provider.

3. The computer implemented method of claim 1, wherein the access sharing relationship is a first access sharing relationship further comprising creating a second access sharing relationship in the computer environment, wherein the access receiver of the first access sharing relationship is also the access provider in the second access sharing relationship.

4. The computer implemented method of claim 1, wherein the access sharing relationship is a first access sharing relationship further comprising creating a second access sharing relationship in the computer environment, wherein the access provider of the first access sharing relationship is also the access receiver in the second access sharing relationship.

5. The computer implemented method of claim 1, further comprising creating another access sharing relationship that is symmetrical to the access sharing relationship, such that an access provider in the another access sharing relationship is the access receiver in the access sharing relationship and an access receiver in the another access sharing relationship is the access provider in the access sharing relationship, creating a bi-directional access sharing relationship.

6. The computer implemented method of claim 1, wherein the step for sharing shares access to at least one of the entity and the file.

7. The computer implemented method of claim 1, further comprising evolving the access rights of the receiver over time in response to changes in the access rights of the provider.

8. The computer implemented method of claim 1, wherein the access rights include access constraints.

9. The computer implemented method of claim 1, wherein the step of defining the subset includes removing from the subset another subset of access, wherein the another subset contains access for which a manage exclusion is applied, so that the evolution is deferred by the manage exclusion for a limited or unlimited period time during serial workflow.

10. The computer implemented method of claim 1, wherein the step of defining the subset includes adding to the subset another subset of access, wherein the another subset contains access for which a manage exclusion is released, so that access automatically evolves as a result of the completion of an iteration of serial workflow.

11. The computer implemented method of claim 1, wherein the access sharing relationship is defined between autonomous peers in a distributed network.

12. The computer implemented method of claim 11, wherein the access sharing relationship is defined between one company and another company.

13. The computer implemented method of claim 1, further comprising deferring an iteration of access evolution for some limited or unlimited period of time by a manage exclusion, providing serial workflow.

14. The computer implemented method of claim 1, further including executing parallel workflow if access evolution is not deferred for some limited or unlimited period of time by a manage exclusion, providing parallel workflow.

15. The computer implemented method of claim 6, wherein the entity comprises a tuple.

16. The computer implemented method of claim 1, wherein the access receiver having a second set of access rights evolving as an automated function of the first set of rights by way of the shared subset, becomes a second access provider and shares at least a subset of the evolving second set of access rights with a second access receiver having a third set of access rights evolving as an automated function of the second set of access rights, wherein the access sharing relationship is at least one access sharing relationships in a network of access control.

17. The computer implemented method of claim 1, wherein the access receiver is one of a plurality of access receivers and the access provider is one of a plurality of access providers, any access receiver becoming one of the plurality of access providers by granting access rights to any of the plurality of access receivers.

18. The computer-implemented method of claim 17, wherein the step of granting access rights to any of the plurality of access receivers creates a hierarchical tree of derived and evolving access.

19. The computer-implemented method of claim 1, wherein after the step of sharing the subset with the access receiver, any changes made by the access receiver to the entity or the file related to the subset automatically flow back to the access provider as long as the manage exclusion remains released.

20. The computer-implemented method of claim 1, wherein the step of sharing the subset with the access receiver shares the entity or file in real-time, subject to the evolving access rights of the access receiver.

21. A computer program product embodied in a computer readable storage medium as computer executable instructions for implementing access evolution for automating the sharing of access rights in a computer environment having one or more access sharing relationships, the instructions when executed by a computer performing the steps of:
   a) creating an access sharing relationship in which an access provider having a first set of access rights shares at least a subset of the first set of access rights with an access receiver having a second set of access rights, so that the second set of access rights evolves as an automated function of the first set of access rights by way of the shared subset, wherein the access sharing relationship is one of one or more access sharing relationships in a network of access control;

b) defining the subset based on constraints of the access sharing relationship; and c) sharing the subset with the access receiver, whereby the steps of defining and sharing comprise an iteration of access evolution, wherein the access provider has access rights to a newer version of an entity or file and the access receiver has access rights to an older version of the entity or file and deferring the sharing of the access rights to the newer version with the access receiver for a period of time, so that the access receiver has access to the older version prior to releasing a manage exclusion, and upon releasing a manage exclusion, the access receiver receiving access to the newer version, and wherein the steps of creating, defining, and sharing are performed by a computer.

22. The computer program product of claim 21, wherein the sharing is implemented by derived access control, such that the access receiver derives access from the provider.

23. The computer program product of claim 21, wherein the access sharing relationship is a first access sharing relationship further including creating a second access sharing relationship in the computer environment, wherein the access receiver of the first access sharing relationship is also the access provider in the second access sharing relationship.

24. The computer program product of claim 21, wherein the access sharing relationship is a first access sharing relationship further comprising creating a second access sharing relationship in the computer environment, wherein the access provider of the first access sharing relationship is also the access receiver in the second access sharing relationship.

25. The computer program product of claim 21, further comprising the step of creating another access sharing relationship that is symmetrical to the access sharing relationship, such that an access provider in the another access sharing relationship is the access receiver in the access sharing relationship and an access receiver in the another access sharing relationship is the access provider in the access sharing relationship, creating a bi-directional access sharing relationship.

26. The computer program product of claim 21, wherein the step for sharing shares access to at least one of the entity and the file.

27. The computer program product of claim 21, further comprising the step of evolving the access rights of the receiver over time in response to changes in the access rights of the provider.

28. The computer program product of claim 21, wherein the access rights include access constraints.

29. The computer program product of claim 21, wherein the step of defining the subset includes removing from the subset another subset of access, wherein the another subset contains access for which a manage exclusion is applied, so that the evolution is deferred by the manage exclusion for a limited or unlimited period time during serial workflow.

30. The computer program product of claim 21, wherein the step of defining the subset includes adding to the subset another subset of access, wherein the another subset contains access for which a manage exclusion is released, so that access automatically evolves as a result of the completion of an iteration of serial workflow.

31. The computer program product 21, wherein the access sharing relationship is defined between autonomous peers in a distributed network.

32. The computer program product of claim 31, wherein the access sharing relationship is defined between one company and another company.

33. The computer program product of claim 21, further comprising the step of deferring an iteration of access evolution for some limited or unlimited period of time by a manage exclusion, providing serial workflow.

34. The computer program product of claim 21, further including executing parallel workflow if access evolution is not deferred for some limited or unlimited period of time by a manage exclusion, providing parallel workflow.

35. The computer program product of claim 26, wherein the entity comprises a tuple.

36. The computer program product of claim 21, wherein the access receiver having a second set of access rights evolving as an automated function of the first set of rights by way of the shared subset, becomes a second access provider and shares at least a subset of the evolving second set of access rights with a second access receiver having a third set of access rights evolving as an automated function of the second set of access rights, wherein the access sharing relationship is at least one access sharing relationship in a network of access control.

37. The computer program product of claim 21, wherein the access receiver is one of a plurality of access receivers and the access provider is one of a plurality of access providers, any access receiver becoming one of the plurality of access providers by granting access rights to any of the plurality of access receivers.

38. The computer program product of claim 37, wherein the step of granting access rights to any of the plurality of access receivers creates a hierarchical tree of derived and evolving access.

39. The computer program product of claim 21, wherein after the step of sharing the subset with the access receiver, any changes made by the access receiver to the entity or the file related to the subset automatically flow back to the access provider as long as the manage exclusion remains released.

40. The computer program product of claim 21, wherein the step of sharing the subset with the access receiver shares the entity or file in real-time, subject to the evolving access rights of the access receiver.

* * * * *